United States Patent
Kitchens, II et al.

(10) Patent No.: US 9,798,372 B2
(45) Date of Patent: Oct. 24, 2017

(54) DEVICES AND METHODS OF SENSING COMBINED ULTRASONIC AND INFRARED SIGNAL

(71) Applicant: Qualcomm Incorporated, San Diego, CA (US)

(72) Inventors: Jack Conway Kitchens, II, Buffalo, NY (US); John Keith Schneider, Snyder, NY (US); David William Burns, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/137,439

(22) Filed: Dec. 20, 2013

(65) Prior Publication Data

US 2014/0354823 A1 Dec. 4, 2014

Related U.S. Application Data

(60) Provisional application No. 61/830,548, filed on Jun. 3, 2013, provisional application No. 61/830,601, filed
(Continued)

(51) Int. Cl.
*G06F 1/32* (2006.01)
*G06F 3/042* (2006.01)
(Continued)

(52) U.S. Cl.
CPC ........ *G06F 1/3215* (2013.01); *G01S 7/52085* (2013.01); *G02F 1/13338* (2013.01); *G06F 3/02* (2013.01); *G06F 3/042* (2013.01); *G06F 3/043* (2013.01); *G06F 3/044* (2013.01); *G06F 3/0412* (2013.01); *G06F 3/0414* (2013.01);
(Continued)

(58) Field of Classification Search
CPC ..................................................... G06F 1/3215
See application file for complete search history.

(56) References Cited

U.S. PATENT DOCUMENTS

| 5,495,137 A | 2/1996 | Park et al. |
| 5,610,629 A | 3/1997 | Baur |

(Continued)

FOREIGN PATENT DOCUMENTS

| EP | 2390764 A1 | 11/2011 |
| GB | 2196164 A | 4/1988 |

(Continued)

OTHER PUBLICATIONS

International Search Report and Written Opinion—PCT/US2014/039700—ISA/EPO—Aug. 1, 2014.
(Continued)

*Primary Examiner* — James Pontius
(74) *Attorney, Agent, or Firm* — Weaver Austin Villeneuve & Sampson LLP—QUAL

(57) ABSTRACT

A method is disclosed, including obtaining an infrared representation based on a detected infrared signal and obtaining a combined representation based on a detected combined ultrasonic and infrared signal. An output representation is generated from the infrared representation and the combined representation. The output representation can be generated from a comparison between the combined representation and the infrared signal representation.

26 Claims, 33 Drawing Sheets

Related U.S. Application Data on Jun. 3, 2013, provisional application No. 61/830,606, filed on Jun. 3, 2013.

(51) Int. Cl.

| | | |
|---|---|---|
| *G01S 7/52* | (2006.01) | |
| *H04N 5/33* | (2006.01) | |
| *G02F 1/1333* | (2006.01) | |
| *G06F 3/041* | (2006.01) | |
| *G06K 9/00* | (2006.01) | |
| *G06K 9/62* | (2006.01) | |
| *G06F 3/043* | (2006.01) | |
| *G06F 3/044* | (2006.01) | |
| *G06F 3/02* | (2006.01) | |

(52) U.S. Cl.
CPC ......... *G06F 3/0421* (2013.01); *G06K 9/0002* (2013.01); *G06K 9/0004* (2013.01); *G06K 9/6293* (2013.01); *H04N 5/33* (2013.01); *G02F 2201/52* (2013.01); *G06F 2203/04106* (2013.01); *H01H 2219/066* (2013.01)

(56) References Cited

U.S. PATENT DOCUMENTS

| | | | |
|---|---|---|---|
| 5,751,059 A | 5/1998 | Prost | |
| 6,008,868 A | 12/1999 | Silverbrook | |
| 6,459,424 B1 | 10/2002 | Resman | |
| 6,634,554 B1* | 10/2003 | Merchant | 235/462.23 |
| 6,859,196 B2 | 2/2005 | Kehlstadt | |
| 7,532,541 B2 | 5/2009 | Govindswamy et al. | |
| 8,193,685 B2 | 6/2012 | Klee et al. | |
| 8,201,739 B2 | 6/2012 | Schneider et al. | |
| 2003/0062490 A1 | 4/2003 | Fujieda | |
| 2004/0215072 A1* | 10/2004 | Zhu | A61B 5/0091 600/407 |
| 2005/0083310 A1 | 4/2005 | Safai et al. | |
| 2005/0212916 A1 | 9/2005 | Nakamura et al. | |
| 2006/0017871 A1 | 1/2006 | Morimoto et al. | |
| 2006/0055642 A1 | 3/2006 | Daughenbaugh et al. | |
| 2006/0082549 A1 | 4/2006 | Hoshino et al. | |
| 2006/0114247 A1 | 6/2006 | Brown | |
| 2007/0008066 A1 | 1/2007 | Fukuda | |
| 2008/0122803 A1 | 5/2008 | Izadi et al. | |
| 2008/0231564 A1 | 9/2008 | Harada et al. | |
| 2008/0259051 A1 | 10/2008 | Ota | |
| 2008/0294315 A1 | 11/2008 | Breed | |
| 2008/0297487 A1 | 12/2008 | Hotelling et al. | |
| 2008/0309631 A1 | 12/2008 | Westerman et al. | |
| 2009/0027352 A1 | 1/2009 | Abele | |
| 2009/0146967 A1 | 6/2009 | Ino et al. | |
| 2009/0295692 A1 | 12/2009 | Lee et al. | |
| 2009/0309616 A1 | 12/2009 | Klinghult et al. | |
| 2010/0097345 A1 | 4/2010 | Jang et al. | |
| 2010/0117970 A1 | 5/2010 | Burstrom et al. | |
| 2010/0156847 A1 | 6/2010 | No et al. | |
| 2010/0277040 A1* | 11/2010 | Klee | B06B 1/0292 310/324 |
| 2010/0309171 A1 | 12/2010 | Hsieh et al. | |
| 2011/0018893 A1 | 1/2011 | Kim et al. | |
| 2011/0080349 A1 | 4/2011 | Holbein et al. | |
| 2011/0080367 A1 | 4/2011 | Marchand et al. | |
| 2011/0122071 A1 | 5/2011 | Powell | |
| 2011/0153284 A1 | 6/2011 | Li et al. | |
| 2011/0157068 A1 | 6/2011 | Parker et al. | |
| 2011/0163976 A1 | 7/2011 | Barnhoefer et al. | |
| 2011/0215150 A1 | 9/2011 | Schneider et al. | |
| 2011/0250928 A1 | 10/2011 | Schlub et al. | |
| 2011/0267473 A1 | 11/2011 | Kabasawa et al. | |
| 2012/0044093 A1 | 2/2012 | Pala | |
| 2012/0044444 A1 | 2/2012 | Park et al. | |
| 2012/0056835 A1 | 3/2012 | Choo et al. | |
| 2012/0068952 A1 | 3/2012 | Slaby et al. | |
| 2012/0127128 A1 | 5/2012 | Large et al. | |
| 2012/0127136 A1 | 5/2012 | Schneider et al. | |
| 2012/0147698 A1 | 6/2012 | Wong et al. | |
| 2012/0154324 A1 | 6/2012 | Wright et al. | |
| 2012/0200532 A1 | 8/2012 | Powell et al. | |
| 2012/0205646 A1 | 8/2012 | Cho et al. | |
| 2012/0268427 A1 | 10/2012 | Slobodin | |
| 2012/0274548 A1 | 11/2012 | Molen | |
| 2012/0281096 A1* | 11/2012 | Gellaboina | G01F 23/292 348/163 |
| 2012/0327458 A1 | 12/2012 | Baba et al. | |
| 2013/0155031 A1 | 6/2013 | Dahl et al. | |
| 2013/0201134 A1 | 8/2013 | Schneider et al. | |
| 2014/0354597 A1 | 12/2014 | Kitchens, II et al. | |
| 2014/0354608 A1 | 12/2014 | Kitchens, II et al. | |
| 2014/0354905 A1 | 12/2014 | Kitchens et al. | |

FOREIGN PATENT DOCUMENTS

| | | |
|---|---|---|
| GB | 2478421 A | 9/2011 |
| JP | H04184823 A | 7/1992 |
| JP | H08272496 A | 10/1996 |
| KR | 100807622 B1 | 2/2008 |
| KR | 20130035110 A | 4/2013 |
| WO | 0110296 A2 | 2/2001 |
| WO | 2005024712 A1 | 3/2005 |
| WO | WO 2014197243 | 12/2014 |
| WO | WO 2014197245 | 12/2014 |
| WO | WO 2014197247 | 12/2014 |
| WO | WO 2014197252 | 12/2014 |

OTHER PUBLICATIONS

Abileah A., et al., "59.3: Integrated Optical Touch Panel in a 14.1 AMLCD," SID Symposium Digest of Technical Papers, vol. 35 (1), May 25-27, 2004, pp. 1544-1547, XP007012013, Chapter 3, Optical Performance.

Aaron C. et al., "A low cost multi-wavelength tomography system based on LED sources", Optical Tomography and Spectroscopy of Tissue IX, SPIE, 1000 20th St. Bellingham WA 98225-6705 USA, vol. 7896,No. 1, Feb. 10, 2011, pp. 1-6, XP060007949.

Anonymous: Ultrasonic sensor—Wikipedia, the free encyclopedia . . . , May 2, 2013, XP55133997, Retrieved from the Internet: URL:http://en.wikipedia.org/w/index.php?title=Ultrasonicsensor&oldid=553222621, [retrieved on Aug. 8, 2008] the whole document, pp. 1.

Cima L. et al., "Ferroelectric active sensors", Sensors and Actuators A, Elsevier Sequoia S.A., Lausanne, CH, vol. 119, No. 1, Mar. 28, 2005, pp. 120-127, XP027806833.

Liu J.C., et al., "A CMOS Micromachined Capacitive Sensor Array for Fingerprint Detection", IEEE Sensors Journal, IEEE Service Center, New York, NY, US, vol. 12, No. 5, May 1, 2012, pp. 1004-1010, XP011440782.

Pecora A., et al., "Flexible PVDF-TrFE pyroelectric Sensor Driven by Polysilicon Thin Film Transistor Fabricated on Ultra-Thin Polyimide Substrate", Sensors and Actuators A: Physical, 2012, vol. 185, pp. 39-43.

Zhu Q. et al., "Design of Near-Infrared Imaging Probe With the Assistance of Ultrasound Localization", Applied Optics,Optical Society of America, Washington, DC; US, vol. 40, No. 19, Jul. 1, 2001,pp. 3288-3303, XP001100250.

Zhu Q., "Imager That Combines Near-Infrared Diffusive Light and Ultrasound", Optics Letters, Optical Society of America, US, vol. 24, No. 15, Aug. 1, 1999, pp. 1050-1052, XP000859237.

Burgess D.E., "Pyroelectrics in a harsh environment", International Society for Optics and Photonics Orlando Technical Symposium, Jan. 1, 1988, pp. 139-150, XP055190428, [retrieved on May 20, 2015].

U.S. Office Action dated Jul. 2, 2015, issued in U.S. Appl. No. 14/137,423.

U.S. Final Office Action dated Dec. 14, 2015, issued in U.S. Appl. No. 14/137,423.

U.S. Notice of Allowance dated Jan. 15, 2016, issued in U.S. Appl. No. 14/137,423.

(56) References Cited

OTHER PUBLICATIONS

U.S. Office Action dated Jul. 16, 2015, issued in U.S. Appl. No. 14/137,474.
U.S. Final Office Action dated Dec. 24, 2015, issued in U.S. Appl. No. 14/137,474.
U.S. Notice of Allowance dated Mar. 11, 2016, issued in U.S. Appl. No. 14/137,474.
U.S. Office Action dated Aug. 5, 2015, issued in U.S. Appl. No. 14/137,489.
U.S. Final Office Action dated Feb. 25, 2016, issued in U.S. Appl. No. 14/137,489.
Invitation to Pay Additional Fees and, Where Applicable, Protest Fee and Partial International Search Report—PCT/US2014/039673—ISA/EPO—Sep. 9, 2014.
International Search Report—PCT/US2014/039673—ISA/EPO—Nov. 26, 2014.
International Written Opinion—PCT/US2014/039673—ISA/EPO—Nov. 26, 2014.
International Preliminary Report on Patentability—PCT/US2014/039673—ISA/EPO—Dec. 3, 2015.
International Search Report—PCT/US2014/039709—ISA/EPO—Nov. 17, 2014.
International Written Opinion—PCT/US2014/039709—ISA/EPO—Dec. 3, 2015.
International Preliminary Report on Patentability—PCT/US2014/039709—ISA/EPO—Dec. 17, 2015.
International Search Report—PCT/US2014/039747—ISA/EPO—Feb. 18, 2015.
International Written Opinion—PCT/US2014/039747—ISA/EPO—Dec. 3, 2015.
International Preliminary Report on Patentability—PCT/US2014/039747—ISA/EPO—Jul. 30, 2015.
U.S. Notice of Allowance dated May 10, 2016, issued in U.S. Appl. No. 14/137,423.
European Office Action dated Jun. 2, 2016 Issued in EP 14 733 853.7.
Dahiya, Ravinder et al., (Jul. 2009) "Piezoelectric oxide semiconductor field effect transistor touch sensing devices," Applied Physics Letters, A I P Publishing LLC, US, 95(3):34105-34105.

* cited by examiner $$US\_IMAGE(FP, TC, df, bf, con) \equiv \begin{vmatrix} GB \leftarrow 255 \\ GD \leftarrow 0 \\ \text{for } r \in 0..\text{rows}(FP) - 1 \\ \quad \text{for } c \in 0..\text{cols}(FP) - 1 \\ \quad\quad \begin{vmatrix} fp_{r,c} \leftarrow GD \\ fp_{r,c} \leftarrow GB + \text{floor}\left[\left(\frac{GB - GD}{bf_{r,c} - df_{r,c}}\right)[(FP_{r,c} - bf_{r,c}) - (TC_{r,c} - df_{r,c}) \cdot con]\right] \text{ if } bf_{r,c} \neq df_{r,c} \\ fp_{r,c} \leftarrow 0 \text{ if } fp_{r,c} < 0 \\ fp_{r,c} \leftarrow 255 \text{ if } fp_{r,c} > 255 \end{vmatrix} \\ fp \end{vmatrix}$$

Fig. 6

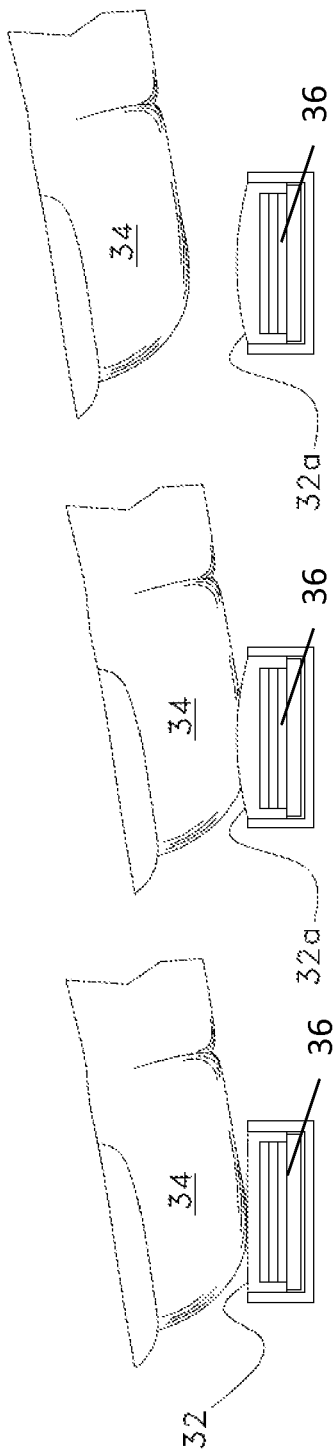
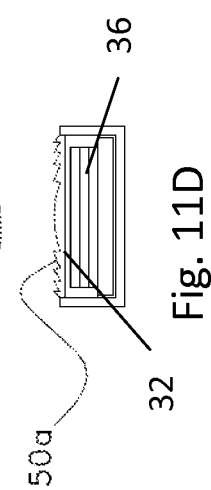
Fig. 11A  Fig. 11B  Fig. 11C  Fig. 11D

DEVICES AND METHODS OF SENSING COMBINED ULTRASONIC AND INFRARED SIGNAL

CROSS-REFERENCE TO RELATED APPLICATIONS

This application claims the benefit of priority to U.S. provisional patent application Ser. No. 61/830,548 filed Jun. 3, 2013; U.S. provisional patent application Ser. No. 61/830,601 filed Jun. 3, 2013; and U.S. provisional patent application Ser. No. 61/830,606 filed Jun. 3, 2013, the disclosures of which are incorporated herein by reference.

FIELD OF THE DISCLOSURE

The present disclosure relates to devices and methods of sensing.

BACKGROUND OF THE DISCLOSURE

Piezoelectricity describes the electric charge that accumulates within some solid materials (such as crystals, certain ceramics, and biological matter such as chitin, bone, DNA and various proteins) in response to an applied mechanical force. The word piezoelectricity means electricity resulting from pressure.

The piezoelectric effect is understood as the electromechanical interaction between the mechanical and the electrical states in crystalline and polycrystalline dielectric materials having no inversion symmetry. The piezoelectric effect is a reversible process, in that materials exhibiting the direct piezoelectric effect (the generation of electrical charge resulting from an applied mechanical force) also exhibit the reverse piezoelectric effect (the generation of a mechanical force resulting from an applied electrical field). For example, polyvinylidene fluoride (PVDF) polymeric crystals may generate measurable piezoelectricity when their static structure is deformed. Conversely, those same polymeric crystals will change their static dimensions when an external electric field is applied.

Pyroelectricity is the electrical response of a material to a change in temperature. The change in temperature modifies the positions of the atoms slightly within the crystal structure of a pyroelectric material, such that the polarization of the material changes. This polarization change gives rise to a voltage across the material. If the temperature remains constant, the pyroelectric voltage gradually disappears due to leakage current (the leakage can be due to electrons moving through the material, ions moving through the air, current leaking through surface contaminants or test equipment attached to the material, etc.) Very small changes in temperature (as small as $10^{-6}$° C.) can produce a measurable electric potential due to a material's pyroelectric properties.

Pyroelectric charge in polymers and minerals develops on the opposite faces of asymmetric crystals. The direction in which the propagation of the charge tends toward is usually constant throughout a pyroelectric material, but in some materials this direction can be changed by a nearby electric field. These pyroelectric materials are said to exhibit ferroelectricity—a spontaneous electric polarization that can be reversed by the application of an electric field. All pyroelectric materials are also piezoelectric. However, some piezoelectric materials have crystal symmetry that does not allow the pyroelectric effect to manifest.

Piezoelectric materials may be used for ultrasonic sensors. Ultrasonic sensors may be used, for example, in biometrics for detecting a fingerprint. However, these ultrasonic sensors do not generally utilize the pyroelectric characteristics of the piezoelectric material.

SUMMARY OF THE DISCLOSURE

This disclosure describes a method, which may include comparing an infrared signal representation to a combined representation of a detected ultrasonic and infrared signal. The infrared signal representation may be based on a detected infrared signal. The combined representation may be based on a detected combined ultrasonic and infrared signal. An output representation may be generated from the infrared signal representation and the combined representation. In one embodiment, the output representation can be generated from the comparison between the combined representation and the infrared signal representation. The comparison may be based on a difference between the combined representation and the infrared signal representation. The infrared signal and/or the combined ultrasonic and infrared signal may be detected by a piezoelectric device. The infrared signal representation, the combined representation, and/or the output representation may include an image. In the context of the present disclosure, the term "image" may include data embodied as stored data representing an image of an object, as well as stored data derived from a piezoelectric device. The piezoelectric device may be an ultrasonic sensor, an infrared sensor, or the like.

This disclosure also describes detection of an infrared signal (e.g. infrared energy) with a piezoelectric device. An infrared signal representation may be formed from the detected infrared signal. The infrared signal representation may be stored in a memory, for example, a non-transitory computer readable memory.

An ultrasonic signal (e.g. ultrasonic energy) may be transmitted with a piezoelectric device. The transmitted ultrasonic signal may be reflected from a platen where an object may reside, and the reflected signal may be detected by the piezoelectric device. A combined ultrasonic and infrared representation may be formed from the detected ultrasonic signal. The infrared signal representation may be read from memory. A comparison between (a) the infrared image; and (b) the combined ultrasonic and infrared image may be conducted in order to generate an ultrasonic image. The comparison can be a difference between: (a) the infrared image; and (b) the combined ultrasonic and infrared image.

This disclosure also describes a method of removing noise. That method includes obtaining an infrared reference image. The infrared reference image may be an image obtained without an object in view of the piezoelectric device. A combined infrared and ultrasonic reference image may be obtained. The combined reference image may be an image obtained without an object in view of the piezoelectric device. An infrared subject image may be obtained. The infrared subject image of an object may be obtained. A combined infrared and ultrasonic subject image may be obtained. The combined subject image may be of the same object as the infrared subject image. The infrared reference image may be subtracted from the infrared subject image to generate a modified infrared image. The combined reference image may be subtracted from the combined subject image to generate a modified combined image. The modified infrared image can be subtracted from the modified combined image to generate an ultrasonic image.

This disclosure also describes other methods. For example, an infrared signal may be detected with a piezoelectric device integrated into a display. An ultrasonic signal may be sent by the piezoelectric device. A combined ultrasonic and infrared signal may be detected by the piezoelectric device. The display may be controlled in response to the detected infrared signal, the combined ultrasonic and infrared signal, or both the detected infrared signal and the combined ultrasonic and infrared signal.

This disclosure also describes a method of reading out information from a sensor array. The sensor array may be comprised of a plurality of piezoelectric sensors. The piezoelectric sensors may include an ultrasonic transmitter and receiver. Piezoelectric sensor information may be read out by electric circuitry (e.g. with analog-to-digital converters) in row or column fashion, and a computer may be used to create data from the sensor information. That data may be used to create a visual image of an object. The method may include reading sensor information from a sensor array while the ultrasonic transmitter is turned off. The sensor information from the sensor array may be stored in memory. Sensor information from the sensor array may be read with the ultrasonic transmitter on. The sensor information may be stored for later use. For example, the stored sensor information collected from the sensor array with the ultrasonic transmitter off may be subtracted from the stored sensor information collected from the sensor array with the ultrasonic transmitter on, and the resulting data set may be stored in memory. The preceding steps may be carried out on a row-by-row basis, or a column-by-column basis.

BRIEF DESCRIPTION OF THE DRAWINGS

For a fuller understanding of the disclosure, reference should be made to the accompanying drawings and the subsequent description. Briefly, the drawings are:

FIG. 6 illustrates an equation that may be used to remove noise in accordance with the method depicted in FIG. 5;

FIGS. 11A-11D depict platen and lens arrangements combined with a piezoelectric device;

DETAILED DESCRIPTION OF THE DISCLOSURE

This disclosure relates to devices and methods of sensing. The arrangements and methods described herein may be integrated into a visual display, for example, a touch screen display. The touch screen display, such as a monitor, may have one or more types of sensing devices that may be used to obtain information about an object that is in contact with or near to the display. The sensing devices may be provided as a layered array that is attached to the visual display or to component(s) of the display. The sensing devices may be part of an in-cell multifunctional pixel that contains a display pixel and one or more sensing devices. The sensing devices may detect signals emanating, for example, from an object positioned on or near the sensing devices or reflected from a platen positioned above the sensing devices. The sensing devices may be ultrasonic and/or pyroelectric sensors. Although the devices and methods are generally described as being integrated into a visual display, for example, a touch screen display, the sensor arrangements and methods may be implemented without a visual display.

The devices and methods described herein may be used for making biometric measurements. The devices and methods described herein may also be used to provide touchpad operation directly on the visual display surface. For example, the teachings of the present disclosure may be used to impart a touchscreen capability to a visual display in order to detect fingerprints, palmprints, earprints, or a face print (such as a side of a face). The teachings can also be used to detect features that are below or inside the surface of an object, such as below the surface of human skin, including the detection of veins, blood vessels, or tissue. The teachings can also be used to capture information about an object over time, for example, to determine movement of an object. In one example, successive object image information may be used for controlling a cursor, or to perform other controls of a computer that is driving the visual display.

Further advantages may be achieved by using a combination of sensor types. For example, a sensor array may have piezoelectric sensors and pyroelectric sensors. It should be recognized that a piezoelectric material may also exhibit pyroelectric properties. Consequently, it can be possible to use a piezoelectric material to gather ultrasonic information, pyroelectric information, or both by using the same device. When the term "piezoelectric" is used herein, it should be understood that the material or device may also exhibit "pyroelectric" properties, and therefore may be used as a pyroelectric sensor, including as an infrared sensor. The pyroelectric sensors described herein may be able to sense temperature changes as small as a millionth of a degree Centigrade.

Figure 1A:
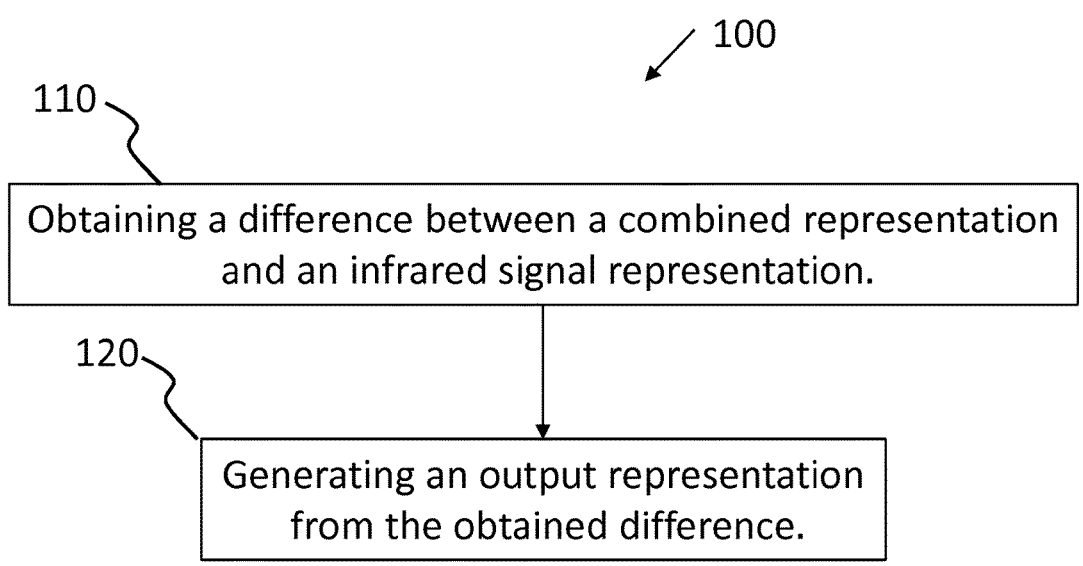
FIGS. 1A-1B illustrate various embodiments of a method for operating an ultrasonic system according to the present disclosure.

FIG. 1A illustrates an embodiment of a method according to the present disclosure. The method 100 may include obtaining 110 a difference between: (a) a combined representation; and (b) an infrared signal representation. The combined representation may be based on a detected combined ultrasonic and infrared signal. The infrared signal representation may be based on a detected infrared signal. An output representation may be generated 120 from the obtained difference. The infrared signal representation and/or the combined representation may be captured by a piezoelectric device. The piezoelectric device may include a receiver that can act as an ultrasonic receiver and an infrared receiver. If the ultrasonic receiver is to be used in an infrared (IR) mode, i.e., a mode in which the receiver is operated as an infrared receiver, the receiver may be configured to sense an infrared signal, but not sense an ultrasonic signal.

Figure 1B:
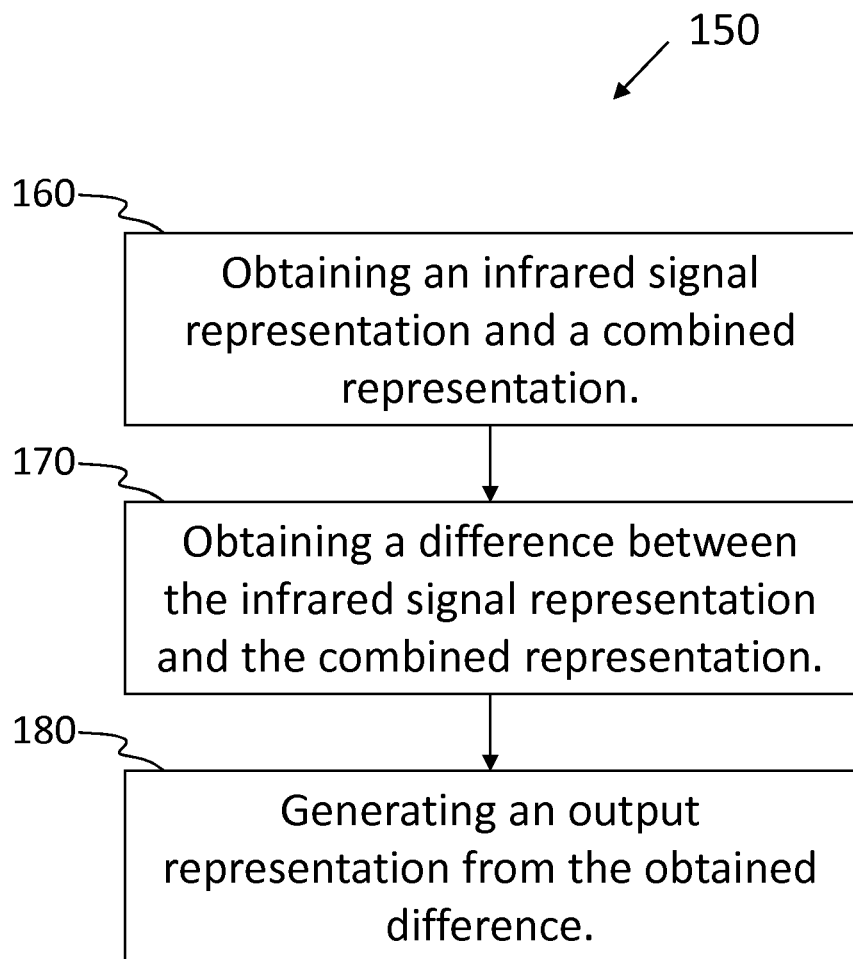

FIG. 1B illustrates another embodiment according to the present disclosure. The method 150 may include obtaining 160 an infrared signal representation and a combined representation. The infrared signal representation may be based on a detected infrared signal. The combined representation may be based on a detected combined ultrasonic and infrared signal. A difference between the infrared signal representation and the combined representation may be obtained 170. An output representation from the obtained difference may be generated 180.

Figure 2:
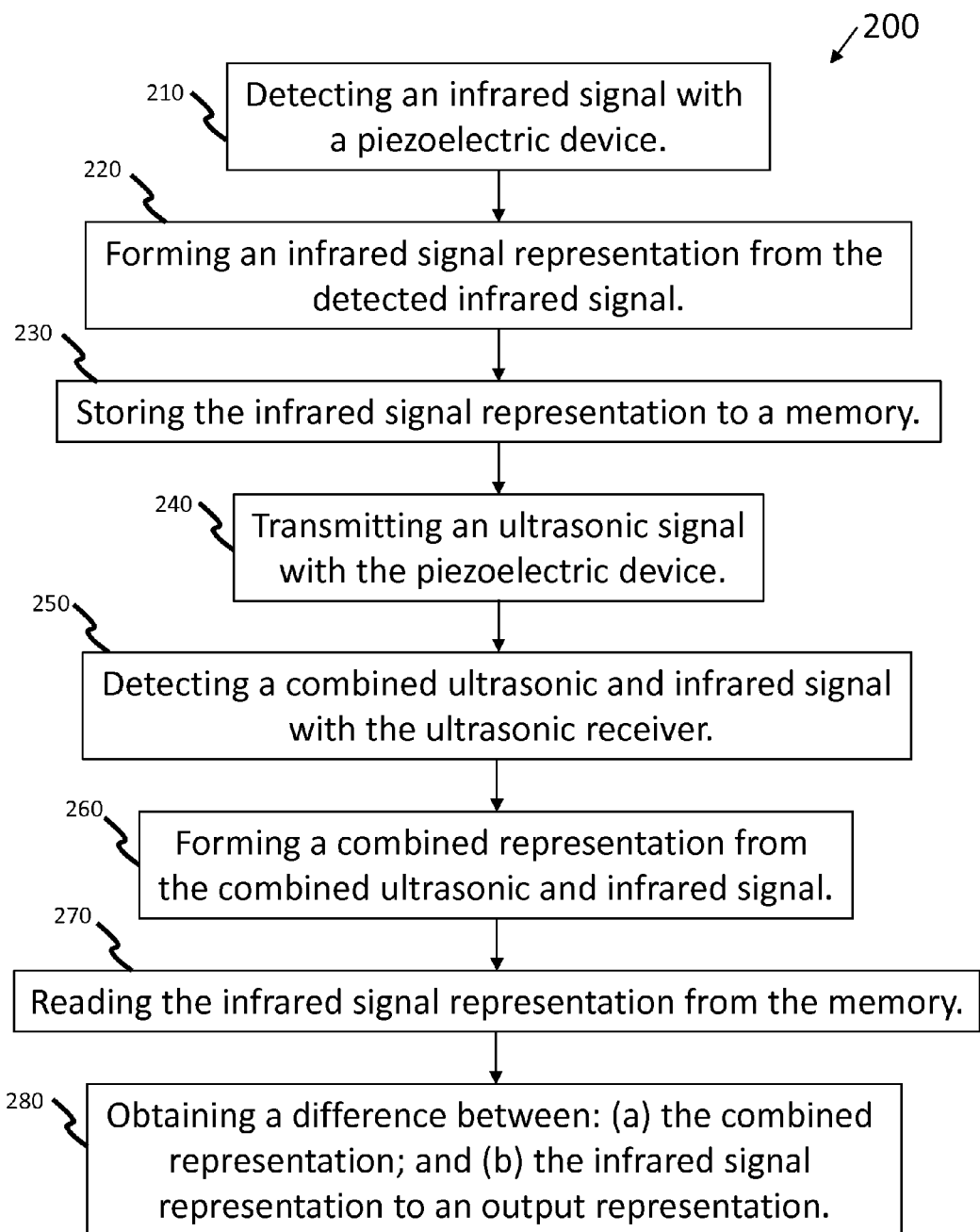
FIG. 2 illustrates another embodiment of a method according to the present disclosure.

FIG. 2 illustrates another embodiment according to the present disclosure. The method 200 may include detecting 210 an infrared signal with a piezoelectric device. The piezoelectric device may include a receiver that can act as an ultrasonic receiver and an infrared receiver, and an ultrasonic transmitter. An infrared signal representation may be formed 220 from the detected infrared signal. The infrared signal representation may be stored 230 in a memory, for example, a non-transitory computer readable memory. An ultrasonic signal may be transmitted 240 with the piezoelectric device. The ultrasonic signal may be transmitted based at least in part on the detected infrared signal. The transmitted ultrasonic signal may be reflected from a platen where an object may reside, and the reflected signal reaching the receiver may be detected 250. The detected reflected signal may be a combined ultrasonic and infrared signal because the receiver may sense ultrasonic and infrared signals. A combined representation may be formed 260 from the combined ultrasonic and infrared signal. The infrared signal representation may be read 270 from the memory. A difference between: (a) the combined representation; and (b) the infrared signal representation may be obtained 280 to generate an output representation. The combined representation, the infrared signal representation, and/or the output representation can be an image or information that can be used to form an image.

FIGS. 3A through 3H illustrate exemplary fingerprint images (3A(i), 3A(ii); 3B(i), 3B(ii); 3C(i), 3C(ii); 3D(i), 3D(ii); 3E(i), 3E(ii); 3F(i), 3F(ii); 3G(i), 3G(ii); 3H(i), 3H(ii)) obtained according to the present disclosure. The pairs of images were captured at different temperatures. In each pair of images 3A-3H, the image on the left (3A(i), 3B(i), 3C(i), 3D(i), 3E(i), 3F(i), 3G(i), 3H(i)) shows a combined ultrasonic and infrared image, and the image on the right (3A(ii), 3B(ii), 3C(ii), 3D(ii), 3E(ii), 3F(ii), 3G(ii), 3H(ii)) shows an ultrasonic image generated by obtaining a difference between: (a) an infrared image; and (b) a combined ultrasonic and infrared image. Table A (below) shows the temperatures where each pair of images were obtained. It should be noted that the present disclosure is not limited to those temperatures listed in Table A. For example, images may be obtained over a temperature range of −40° F. to 155° F. However, it is contemplated that images could be obtained outside this exemplary temperature range.

TABLE A

| | Figures | | | | | | | |
|---|---|---|---|---|---|---|---|---|
| | 3A(i), 3A(ii) | 3B(i), 3B(ii) | 3C(i), 3C(ii) | 3D(i), 3D(ii) | 3E(i), 3E(ii) | 3F(i), 3F(ii) | 3G(i), 3G(ii) | 3H(i), 3H(ii) |
| Temperature | 140° F. | 110° F. | 80° F. | 50° F. | 30° F. | 20° F. | 0° F. | −4° F. |

Figure 3:
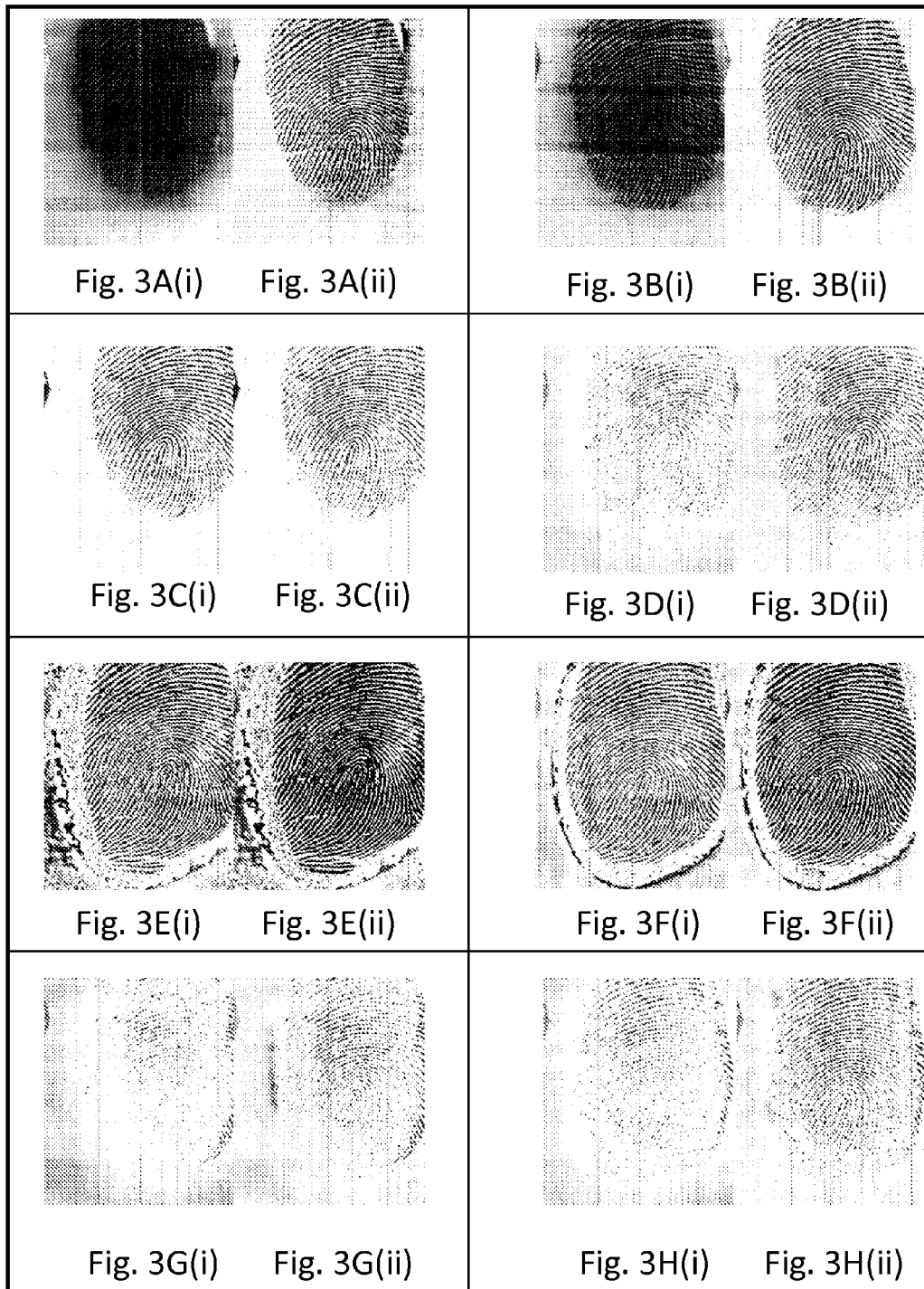
FIGS. 3A(i)-3H(ii) illustrate exemplary fingerprint images obtained according to the present disclosure.

From FIGS. 3A-3H, it can be seen that as temperature rises, an increase in the level of infrared (e.g. infrared energy) may be detected by the piezoelectric device. It should be noted that the level of detail of the combined ultrasonic and infrared images (3A(i), 3B(i), 3C(i), 3D(i), 3E(i), 3F(i), 3G(i), 3H(i)) generally decreases as temperature increases, due to an increase in the level of detected infrared. For example, FIGS. 3A(i) and 3B(i) show images obtained at 140° F. and 110° F., respectively. The images shown in FIGS. 3A(i) and 3B(i), however, are darker than the other combined ultrasonic and infrared images due to a relatively high level of infrared energy detected by the ultrasonic receiver. Similarly, as the ambient temperature decreases, the level of detected infrared may also decrease. Detecting less infrared may result in a higher level of detail being obtained. However, as the temperature approaches, or goes below, the freezing temperature of water, a frozen water vapor halo surrounding an object (e.g. a finger) may be present in the image. As a result, the 0° F. and −4° F. images, shown in FIGS. 3G through 3H, are relatively light due to a loss of the ultrasonic signal (e.g. loss of ultrasonic energy) caused by imaging through a thin frost layer on the platen. The thin frost layer can therefore interfere with receiving a clear image.

The ultrasonic images (3A(ii), 3B(ii), 3C(ii), 3D(ii), 3E(ii), 3F(ii), 3G(ii), 3H(ii)) generally show improvement in detail as compared to the combined ultrasonic and infrared images (3A(i), 3B(i), 3C(i), 3D(i), 3E(i), 3F(i), 3G(i), 3H(i)). In the examples shown, the most significant improvement between images can be seen at the temperatures where the level of infrared is highest (e.g. 3A(i), 3A(ii); and 3B(i), 3B(ii)).

Figure 4:
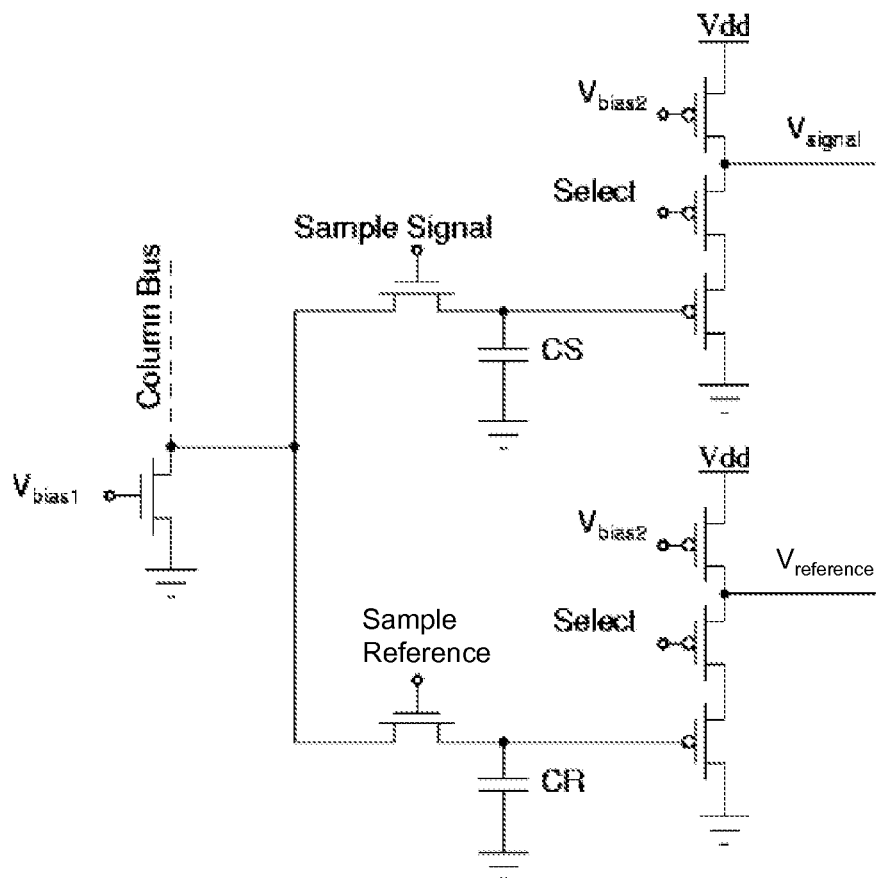
FIG. 4 depicts an exemplary double-correlated sampling circuit.

The present disclosure may also employ techniques to reduce noise from signals detected with a piezoelectric device. For example, a technique referred to as double correlated sampling may be used in order to remove noise from images obtained by a piezoelectric device. Specifically, the method may measure electrical values, such as voltages or currents. The measured values may be used to remove an undesired offset. Particularly, this technique may be used when measuring outputs of the piezoelectric device. The output of the piezoelectric device may be measured twice: once in a known condition and once in an unknown condition. The value measured from the known condition may be subtracted from the unknown condition to generate a value with a known relation to the physical quantity being measured. The technique may be used to reduce noise in which the reference voltage of an individual piezoelectric receiver (e.g., a pixel's voltage after it is reset) is removed from the signal voltage of the individual piezoelectric receiver (e.g., the pixel's voltage at the end of sampling) at the end of each sampling period. FIG. 4 depicts an exemplary double-correlated sampling circuit. A reference voltage level from a column bus line may be stored on a reference capacitor CR when an associated pass transistor is turned on. Similarly, a signal voltage level from the column bus line may be stored on a signal capacitor CS when an associated pass transistor is turned on. When the select voltage is brought high, the signal and reference voltages may be provided on two output terminals. The reference output voltage may be subtracted from the signal output voltage to cancel out or compensate for a non-zero reference signal. Alternatively, double-correlated sampling may be accomplished by software running on a programmable processor system.

Figure 5:
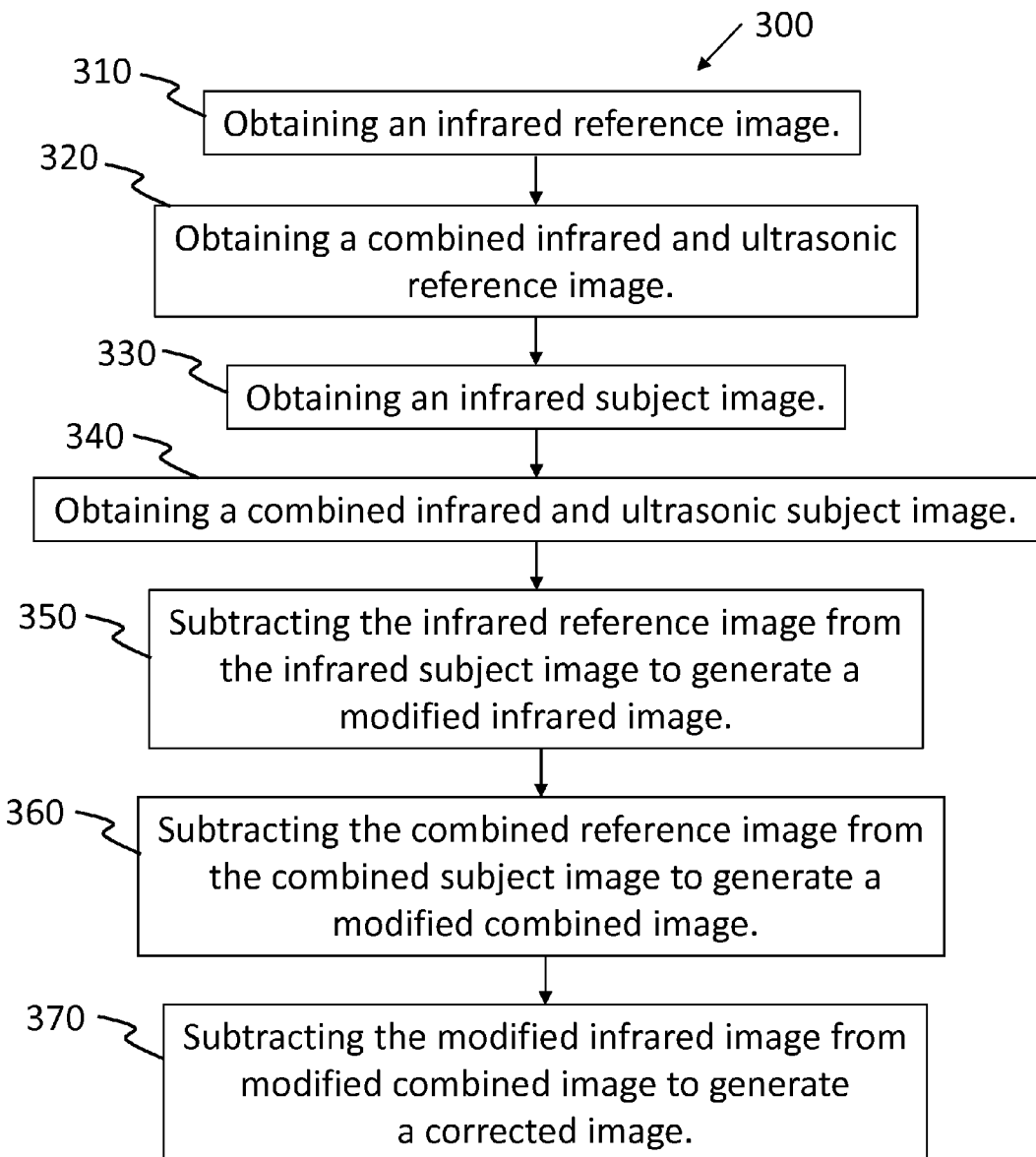
FIG. 5 illustrates a method of removing noise.

FIG. 5 describes a method 300 of removing noise according to the present disclosure. The method 300 includes obtaining 310 an infrared reference image. The infrared reference image may be an image obtained without an object in view of the piezoelectric device (e.g. a known condition). A combined infrared and ultrasonic reference image may be obtained 320. The combined reference image may be an image obtained without an object in view of the piezoelectric device (e.g. a known condition). An infrared subject image can be obtained 330. The infrared subject image may be obtained 330 with an object in view of the piezoelectric device (e.g. an unknown condition). A combined infrared and ultrasonic subject image can be obtained 340 with an object in view of the piezoelectric device (e.g. an unknown condition). The combined subject image may be of the same object as the infrared subject image. The infrared reference image may be subtracted 350 from the infrared subject image to generate a modified infrared image. The combined reference image may be subtracted 360 from the combined subject image to generate a modified combined image. The modified infrared image can be subtracted 370 from the modified combined image to generate an ultrasonic image.

FIG. 6 illustrates an equation that may be used to remove noise in accordance with the method 300, described above. In the equation, "df" represents the infrared reference image (step 310); "bf" represents the combined infrared and ultrasonic reference image (step 320); "TC" represents the infrared subject image (step 330); and "FP" represents the combined infrared and ultrasonic subject image (step 340). "GB" and "GD" represent the limits of the grayscale in the equation. The "con" represents a contrast value, which can be used to enhance the grayscale so that it is easier to view a light image.

Figure 7A:
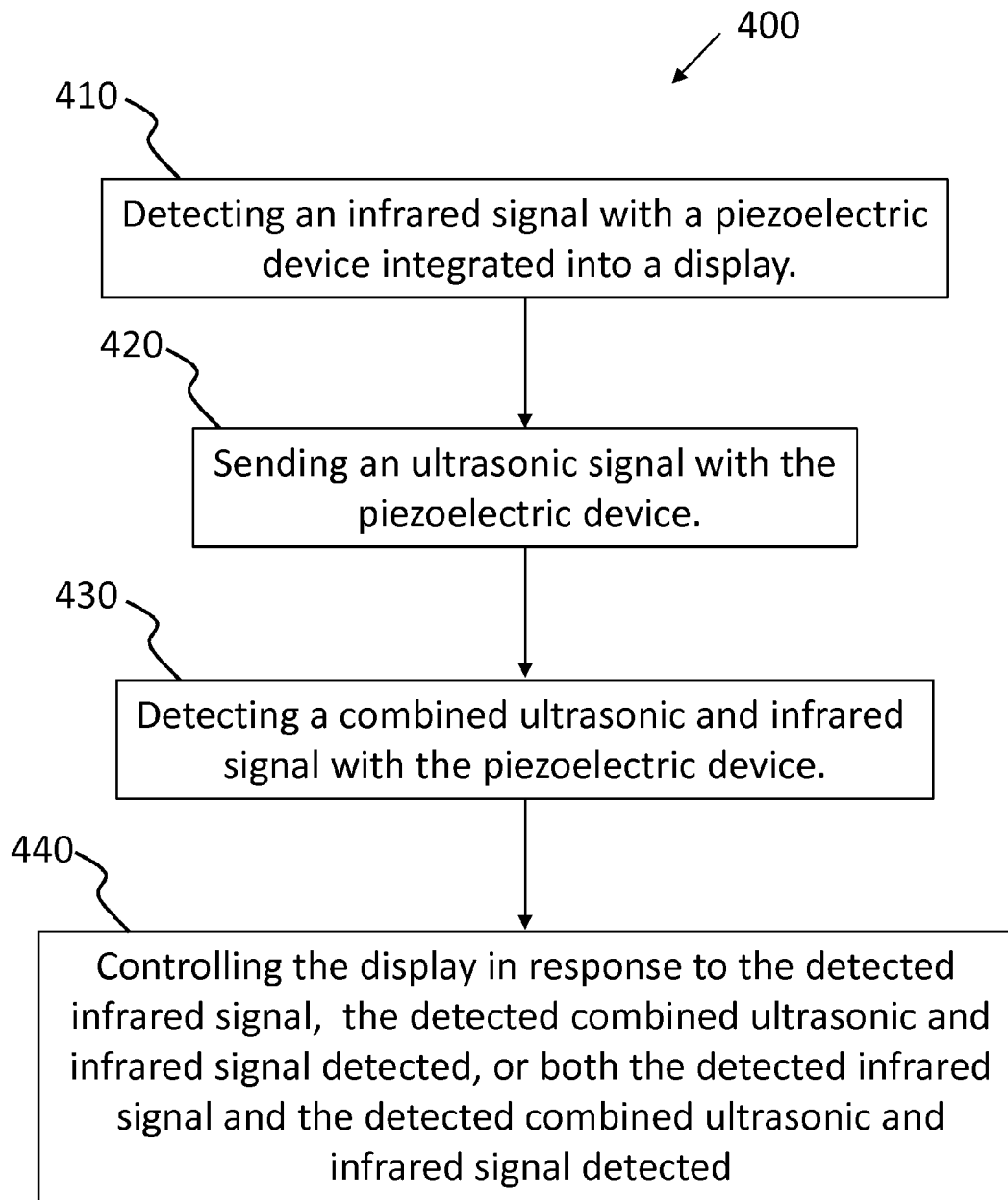
FIGS. 7A-7D depict methods of controlling a display in accordance with the present disclosure.

FIG. 7A depicts a method of controlling a display in accordance with the present disclosure. The method 400 may include detecting 410 an infrared signal with a piezoelectric device integrated into a display. An ultrasonic signal may be sent 420 by the piezoelectric device. A combined ultrasonic and infrared signal may be detected 430 by the piezoelectric device. The combined ultrasonic and infrared signal may correspond to a combination of ultrasonic signals reflected off of a platen and infrared signals corresponding to infrared energy detected by the piezoelectric device. The ultrasonic signals reflected off of the platen may be reflected ultrasonic signals that were sent 420 by the piezoelectric device. The display may be controlled 440 in response to the detected infrared signal, the detected combined ultrasonic and infrared signal, or both the detected infrared signal and the detected combined ultrasonic and infrared signal.

The detected infrared signal may correspond to heat detected from an object. The infrared signal may be used to determine the location or the movement of an object relative to the display or piezoelectric device. In an embodiment, the ultrasonic signal may not be sent until heat from the object is detected by the piezoelectric device and the amount of detected heat exceeds a threshold value. Also, it may be determined that the object has moved away from the display or piezoelectric device by determining that the amount of detected infrared signal has lowered to an amount that is below the threshold value. In that situation, an ultrasonic signal may not be sent in response to detecting that the object has moved away from the display or piezoelectric device. An additional ultrasonic signal may be sent by the piezoelectric device in response to a second detected infrared signal, which may indicate the presence of an additional object.

The method 400 may be useful in controlling power consumption of piezoelectric devices and/or visual displays with integrated piezoelectric devices that are configured to detect infrared energy. For example, the piezoelectric device may be configured to detect the heat from a person's finger, hand, or ear positioned near the display. The piezoelectric device may be embedded in a display and be configured to instruct the display itself or another component of the display, including the piezoelectric device or other piezoelectric devices embedded in the display, to turn on or turn off. For example, the piezoelectric device may turn on an ultrasonic transmitter or ultrasonic receiver in response to detection of heat from the person's hand, finger or ear that is approaching the display. In this manner, the ultrasonic transmitter or ultrasonic receiver may be kept off until needed.

The method 400 may be useful in controlling a display. In one example, the display or a microprocessor in communication with the display may be brought to a more active state from a less active state according to the method 400 when an object approaches the piezoelectric device. This may be useful for purposes of reducing power consumption, and be used to indicate that the user desires to use the display or a device associated with the display. In one embodiment, the display may provide a "welcome message" or other prompt to the user via the visual display in order to indicate that the mobile device is ready to accept the user's instructions. In this manner, the method 400 may be used to detect an event, and generate a response to a user via the visual display.

Figure 7B:
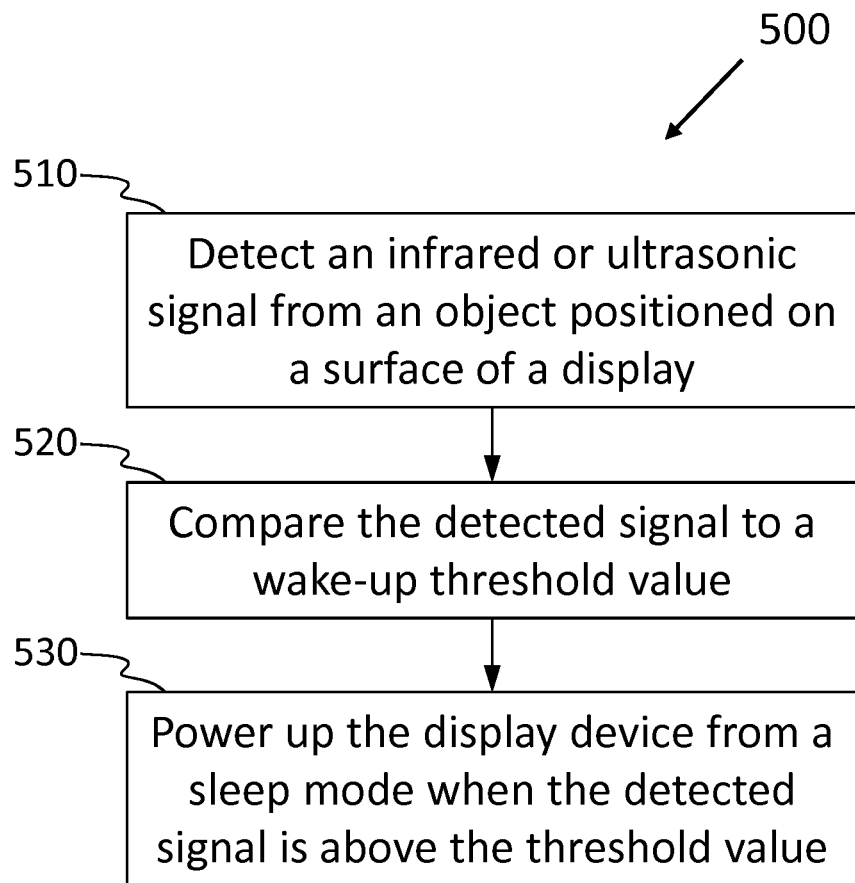

FIG. 7B depicts a method of controlling a display device in accordance with the present disclosure. Allowing the display device to enter into a sleep or low-power mode generally saves battery life and extends the usability of the display device. Methods of detecting the desire of a user to wake up the display device that are low in power may also conserve battery life. In this method 500 of waking up a display device, an infrared or ultrasonic signal may be detected 510 from an object such as a finger or hand positioned near or on a surface of a display associated with the display device. The signal may be detected, for example, with a piezoelectric sensor coupled to the display that may serve as a pyroelectric or acoustic emission sensor. The detected signal may be compared 520 to a wake-up threshold level. If the detected signal is above the threshold level, the display device may be powered up 530 from a sleep mode. The detection of infrared energy from a finger or hand close to or on the display surface may require only a single or partial scan of a sensor array coupled to the display.

FIG. 7B depicts a method of controlling a display device in accordance with the present disclosure. Allowing the display device to enter into a sleep or low-power mode generally saves battery life and extends the usability of the display device. Methods of detecting the desire of a user to wake up the display device that are low in power may also conserve battery life. In this method 500 of waking up a display device, an infrared or ultrasonic signal may be detected 510 from an object such as a finger or hand positioned near or on a surface of a display associated with the display device. The signal may be detected, for example, with a piezoelectric sensor coupled to the display that may serve as a pyroelectric or acoustic emission sensor. The detected signal may be compared 520 to a wake-up threshold value. The threshold value can be a predetermined value or based upon a previous detected signal. If the detected signal is above the threshold value, the display device may be powered up 530 from a sleep mode.

As the piezoelectric sensors described herein may detect acoustic emissions, acoustic emissions from a user tapping, touching, rubbing or otherwise contacting the surface of the display may be also detected with only a single scan or partial scan of the sensor array. Once the display device is woken or otherwise powered up, there may be a need to generate ultrasonic images from a surface of the display device. Similar to method 400, an ultrasonic signal may be transmitted from an ultrasonic transmitter coupled to the display, and an ultrasonic signal that is reflected from the surface of the display may be detected when the display device is powered up. As the ultrasonic sensors and various processors in the display device may consume large amounts of power when fully activated, for example, to collect and process data from the sensors, placing these components into a sleep mode or inactive state when not needed may reduce energy consumption and extend battery life.

Figure 7C:
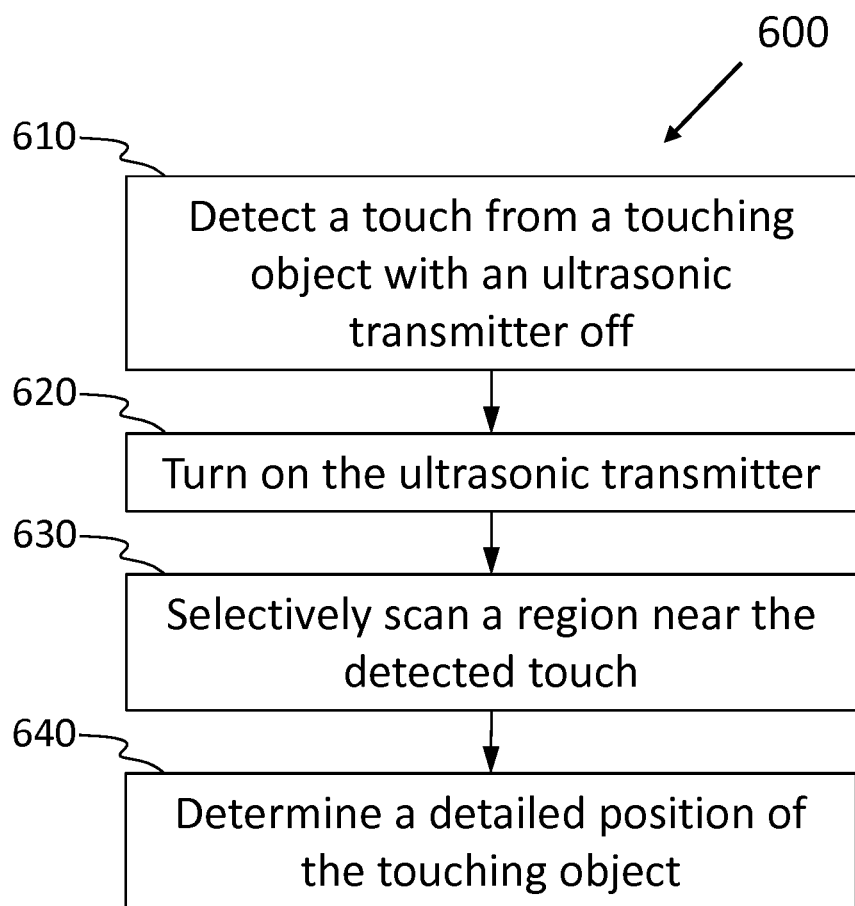

The detection of a finger or hand close to or on the display surface may require only a partial scan of a sensor array coupled to the display. In some implementations, the infrared detection capability of the piezoelectric material may be used to detect an initial touch event from a touching object such as a finger or stylus on the surface of the display, followed by an selective scan of various sensors in the vicinity of the touch to rapidly determine the detailed position of the touching object. FIG. 7C depicts a method of controlling a display device in accordance with the present disclosure. In method 600, a touching object such as a finger or stylus on a surface of a display device may be detected 610 with an ultrasonic transmitter off. The touching object may be detected, for example, from heat or thermal energy emitted from the object or from acoustic emissions as the object touches the surface of the display device. The ultrasonic transmitter may be turned on 620, for example, to generate ultrasonic waves that may be transmitted and reflected from the surface of the display. A region near the detected touch may be selectively scanned 630. For example, ultrasonic sensors in the vicinity of the touch event may be selectively addressed and read out to generate image information of the object on the display surface. A detailed position of the touching object may be determined 640, for example, by processing the image information.

Figure 7D:
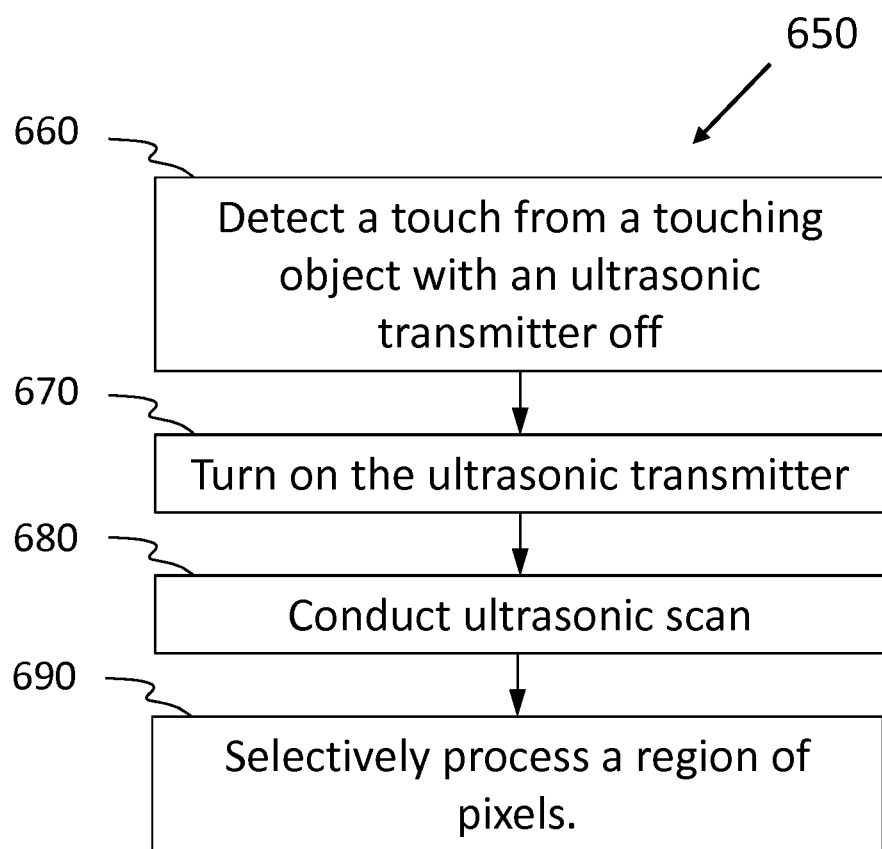

Another embodiment of a partial scan is shown in FIG. 7D. According to this method 650, a touching object such as a finger or stylus on a surface of a display device having a sensor array may be detected 660 with an ultrasonic transmitter off. The touching object may be detected, for example, from heat or thermal energy emitted from the object or from acoustic emissions as the object touches the surface of the display device. The ultrasonic transmitter may be turned on 670, for example, to generate ultrasonic waves that may be transmitted and reflected from the surface of the display. An ultrasonic scan may be conducted 680. The ultrasonic scan may use all of the ultrasonic sensors on the display device. Each ultrasonic sensor may correspond to a pixel. Sensor data from a region of pixels can be selectively processed 690. In one example, the region of pixels may be selectively processed by reading the sensor data from all of the ultrasonic sensors on the display, which may be stored in memory. A region of the pixel data may be selectively transferred to an image processor for image processing. The region of pixel data may correspond to the region near the detected touch. In another example, the region of pixels may be selectively processed by transferring all pixel data to a processor. The processor may then selectively processes a region of pixels that corresponds to the region near the detected touch.

Figure 8:
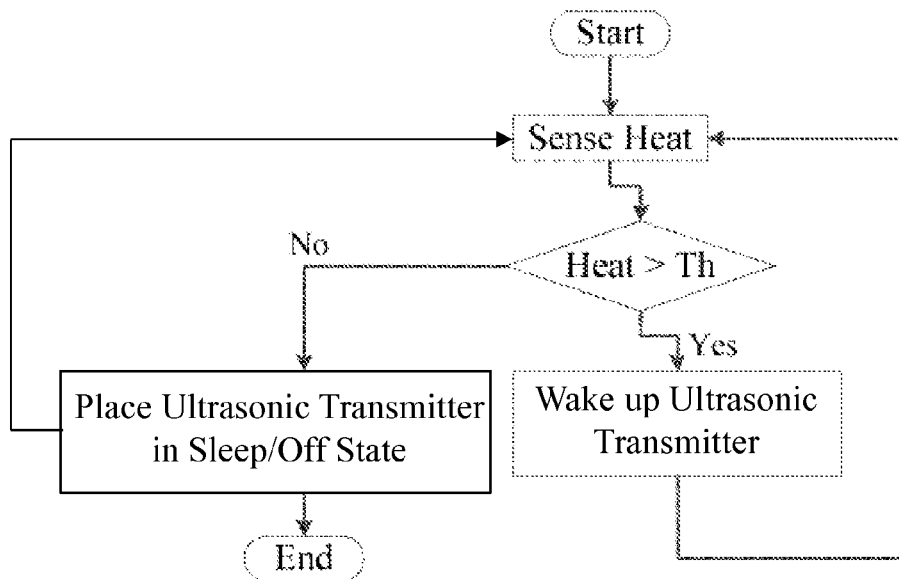
FIG. 8 is a flow diagram describing a method of operating a visual display in accordance with the present disclosure.

FIG. 8 is a flow diagram describing a method of operating a visual display in accordance with the present disclosure. An infrared sensor may detect heat and send a signal that is proportional to the amount of heat sensed by the sensor. The signal may be compared to a threshold, and if the threshold is exceeded, then an ultrasonic transmitter may be activated or woken up. If the threshold is not exceeded, the ultrasonic transmitter may remain or be placed in an inactive state (e.g. placed in a sleep or off state).

Figure 9:
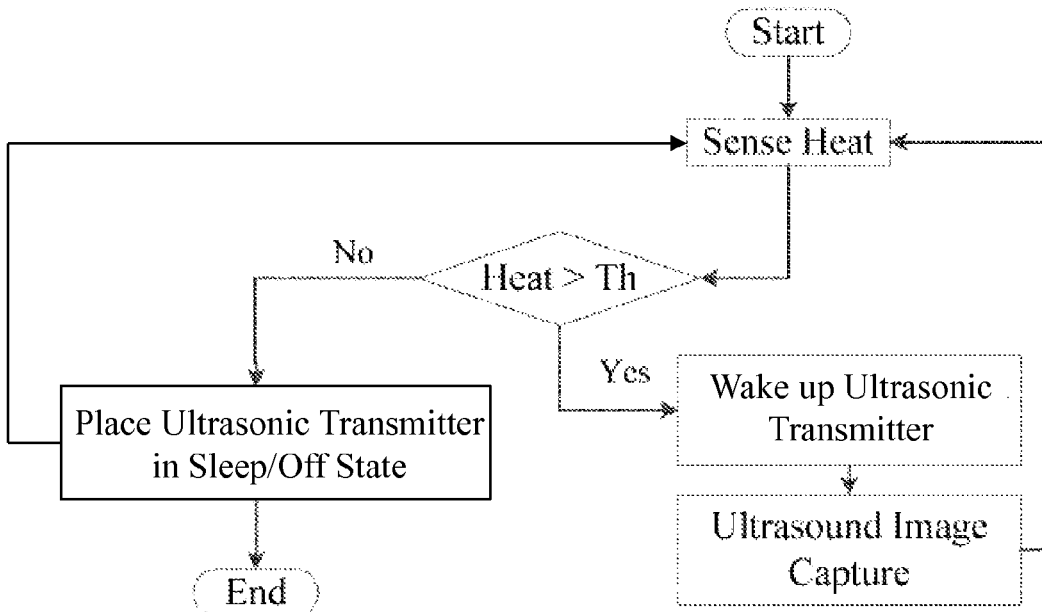
FIG. 9 is another flow diagram describing a method of operating a visual display.

FIG. 9 is another flow diagram describing a method of operating a visual display. An infrared sensor may detect heat and send a signal that is proportional to the amount of heat sensed by the sensor. The signal may be compared to a threshold, and if the threshold is exceeded, an ultrasonic transmitter may be activated. With the ultrasonic transmitter activated, an ultrasonic image may be captured by the piezoelectric sensor. If the threshold is not exceeded, the ultrasonic transmitter may remain or be placed in an inactive state.

Figure 10A:
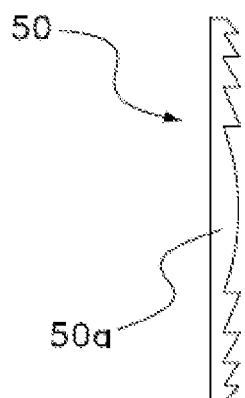
FIGS. 10A-10C depict light and/or acoustic lenses that may be used with a piezoelectric device according to the present disclosure.
Figure 10B:
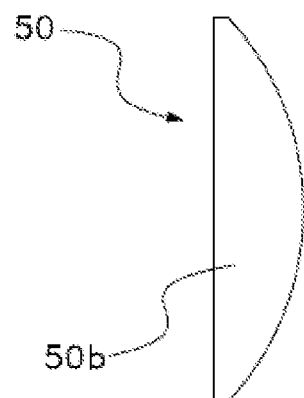
Figure 10C:
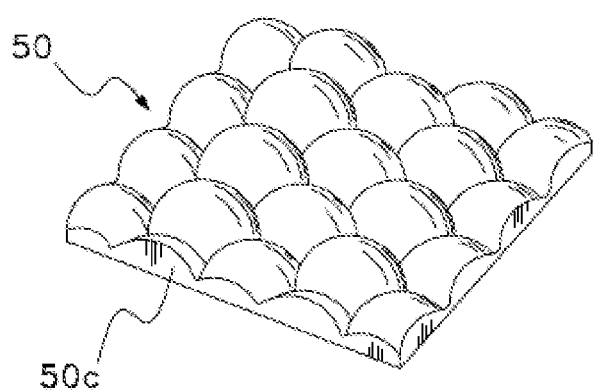

FIGS. 10A-10C depict refractive light and/or acoustic lenses that may be used with piezoelectric devices and/or visual displays with integrated piezoelectric devices according to the present disclosure. The piezoelectric devices described herein may include one or more lenses configured to focus energy from a particular location, which may be on or away from the display, onto one or more piezoelectric (pyroelectric) sensors. The lens may be an optical lens configured to focus infrared or optical energy, or may be an ultrasonic lens configured to focus ultrasonic energy. If an optical lens is provided, it is possible to focus infrared (e.g. infrared energy) without affecting the piezoelectric device's ability to transmit or receive ultrasonic energy. It should be recognized, however, that providing an optical lens to focus infrared energy being sensed by the piezoelectric device can distort an image being produced by the visual display.

Examples of lenses are shown in FIGS. 10A-10C. For example, the lens 50 may be a Fresnel lens 50a (shown in FIG. 10A), a plano-convex optical lens 50b (shown in FIG. 10B), or a micro-lens array 50c (shown in FIG. 10C). The lens 50 can be used to focus the sensor to approximately infinity. In one example, an optical lens may be provided that is approximately ½ inch long by ½ inch wide, and have a thickness between 1/16 inch and 1/50 inch thick. However, other sized lenses are within the scope of the present disclosure. It is also contemplated that the lens 50 may be embodied as a plurality of optically aligned lenses (not shown). Such a plurality of lenses may be fixed or movable relative to one another.

FIGS. 11A-11D depict platen and lens arrangements combined with a piezoelectric device. An optical or acoustic lens 50 may be integrated into or onto one or more layers of a piezoelectric device 36. For example, the lens 50 may be positioned between the sensor circuits 20 and the platen 32. In some implementations, the platen 32 may include a lens 50 or serve as a lens. FIG. 11A depicts an arrangement having a substantially planar platen 32, and in this arrangement the sensor of the piezoelectric device 36 may detect energy emitted or reflected from an object positioned on the exposed surface of the platen 32. FIGS. 11B and 11C depict embodiments where the outermost surface of a platen 32*a* has a curved surface, which may act as a lens. For example, FIG. 11B has a convex platen 32*a*, which can serve as an optical or infrared lens. FIG. 11B shows a finger 34 pressed against the convex platen 32*a* for sensing the finger 34. For example, an ultrasonic image may be taken of the finger 34 in FIG. 11B. An ultrasonic image taken by the arrangement shown in FIG. 11B may be substantially similar to the ultrasonic image taken by the embodiment shown in FIG. 11A because the convex platen 32*a* may not substantially alter the ultrasonic signals. However, it may be necessary to adjust the range gating of the piezoelectric device 36 to accommodate the curved outer surface of the convex platen 32*a*.

FIG. 11C shows a finger 34 spaced away from a convex platen 32*a*. The convex platen 32*a* can focus ultrasonic or infrared (e.g. ultrasonic energy or infrared energy) onto the piezoelectric device 36 to obtain a focused image of the finger 34 when the finger 34 is at a position away from and separated from the outer surface of the convex platen 32*a*. In this manner, an image of an object, such as the finger 34, can be taken with an optical or infrared sensor array without adding an additional layer to the piezoelectric device 36.

The lens 50 can also be distinct from the piezoelectric device. For example, FIG. 11D shows, a piezoelectric device 36 with a Fresnel lens 50*a* positioned above a planar platen 32. Although a Fresnel lens 50*a* is shown, any suitable lens could be used. The lens 50*a* can focus an infrared sensor to obtain a focused image of the finger 34 at a position away from the platen 32. Alternatively, the Fresnel lens 50*a* may be formed monolithically with the platen. Although the lens 50*a* may be fixed to the platen, it is also possible for the lens 50*a* to be displaceable relative to the piezoelectric device 36. For example, the lens 50*a* may be provided to slide into position, or be detachable from the display or piezoelectric sensor.

The convex platen 32*a* shown in FIGS. 11B and 11C may be advantageous for use as a button. The button may be an input for a computer device such as an automatic teller machine, a phone, a tablet computer, or the like. The button may be fixed in position or displaceable for registering an input from a user. In the case of a fixed button, the button may be configured to sense pressure, or determine a user's input with sensor(s) associated with the piezoelectric device. A planar platen 32 may be used as a button in the same manner described above. In some implementations, the curved shape of the convex platen 32*a* may be helpful to a user for differentiating the button from other areas of a device, including other buttons.

If an optical lens is not provided, it may be difficult to obtain a detailed image of an object that is spaced away from the platen. For example, it may be difficult to obtain a photo or infrared image that has the requisite detail to provide meaningful biometric information beyond about 6 mm from the platen. However, an optical or infrared image taken without an optical lens may provide sufficient information to determine the existence of an object or movement of an object that is spaced away from the platen surface. For example, motion of an object may be sensed in a range of about 0.01" to about 2.0" without a lens. Other ranges may be obtained depending on the sensor(s) provided in the piezoelectric device or the object being sensed.

Figure 12A:
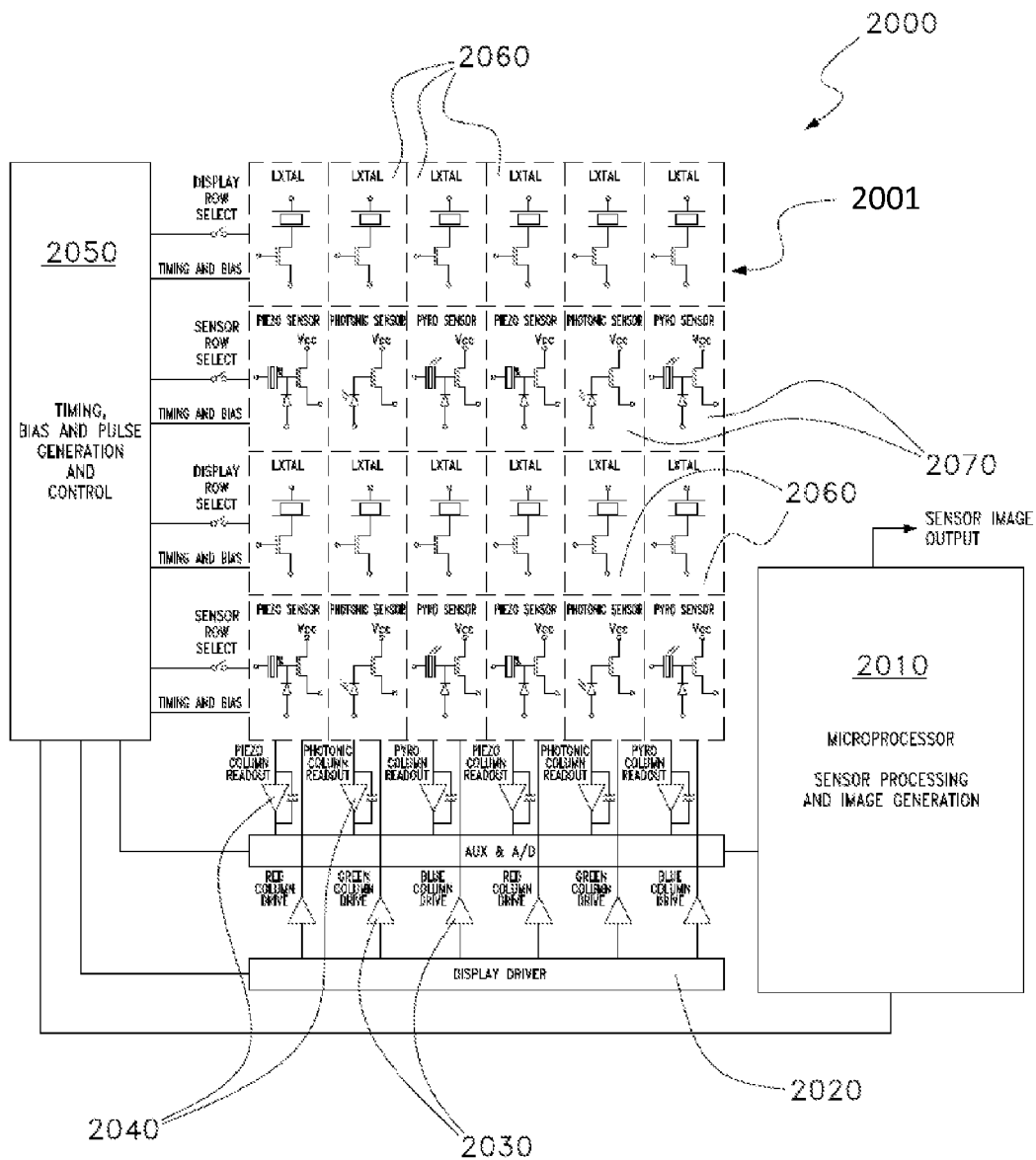
FIGS. 12A-12F depict circuitry that may be used to operate a piezoelectric device.
Figure 12B:
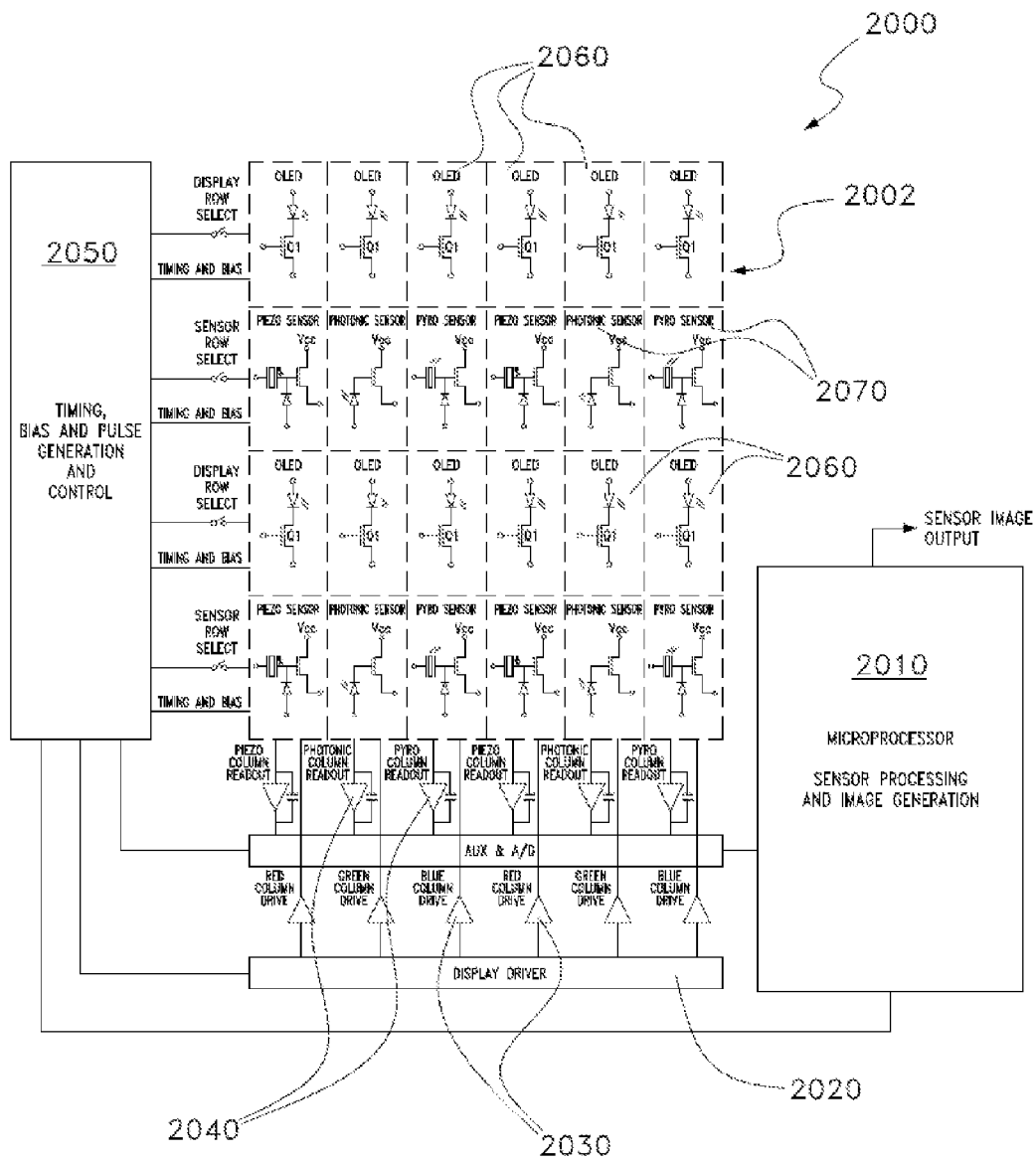

FIGS. 12A and 12B depict circuitry of a multifunctional pixel system that may be used to operate a multifunctional pixel display array. FIG. 12A depicts circuitry 2000 for a multifunctional pixel display array 2001 having LCD display components. FIG. 12B shows circuitry 2000 for a multifunctional pixel display array 2002 having OLED display components. The circuitry 2000 may include a microprocessor 2010 programmed to provide signals to a pixel display array driver 2020 having a column-driver circuit 2030. In addition, the microprocessor 2010 may be programmed to provide signals for operating a sensor array readout circuit 2040. A timing bias and pulse generation control circuit 2050 may be provided, for example, to control the timing and bias of the display circuits 2060 and/or the sensor circuits 2070. The bias and pulse generation control circuit 2050 may be configured to select rows or columns of the multifunctional pixel display array 2001, 2002. While a triad of a piezoelectric sensor, a photoelectric sensor and a pyroelectric sensor is depicted in FIGS. 12A and 12B, one or more sensor types including photoelectric sensors, optical light sensors, infrared light sensors, infrared sensors, ultrasonic sensors, acoustic or acoustic emission sensors, piezoelectric force or pressure sensors, thermal sensors, or capacitive sensors may be configured into one or more multifunctional pixels in the display array.

Figure 12C:
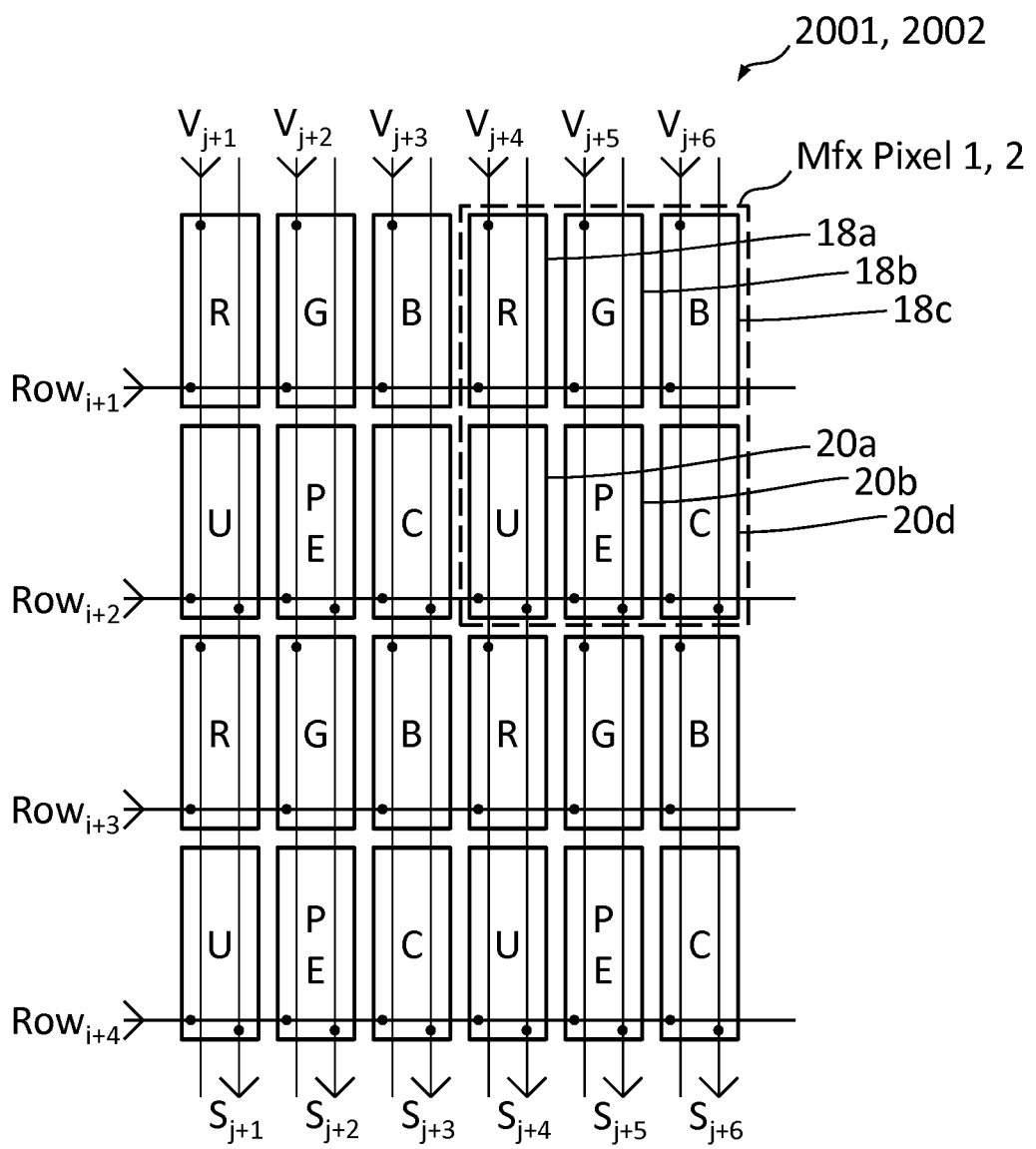
Figure 12D:
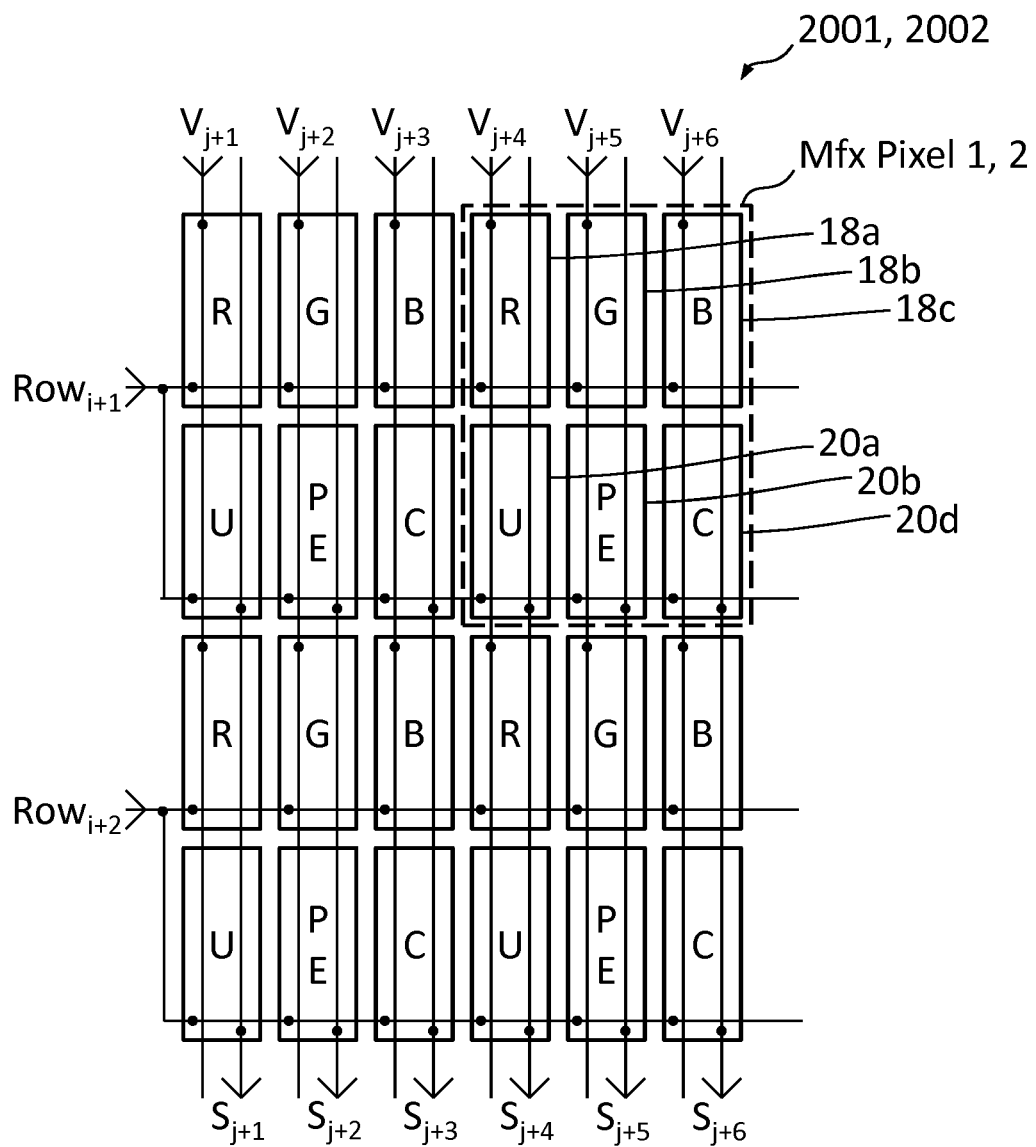

As large numbers of row select lines, column driver lines and sensor readout lines can occlude viewing of the display elements, approaches to minimizing the number of lines may be beneficial. FIG. 12C depicts independent row addressing for a display array 2001, 2002 of multifunctional pixels 1, 2 configured with an LCD or OLED display pixel having three sub-pixels 18*a*, 18*b* and 18*c* for red, green and blue respectively, and three sensors 20*a*, 20*b* and 20*d* representing an ultrasonic sensor, a photoelectric sensor, and a capacitive sensor respectively. Video or display input lines for the display sub-pixels and sensor output signal lines for the sensors are separated. This configuration allows independent frame rates for the display pixels and the sensors, and also allows different sensor resolutions by disabling, discounting, disconnecting, ignoring, not enabling, not accessing, not addressing, or otherwise disregarding certain rows or columns of sensors. In one embodiment, the frame rate, the frame size, and the resolution of the photoelectric sensors, the second sensors, or other sensors in the multifunctional pixel display array may be configured to be adjustable by determining and accessing a subset of sensor rows and columns. In a different embodiment, the number of row select lines may be reduced by addressing a row of display elements and a row of sensor elements with a common row select line, as shown in FIG. 12D. Additional lines for powering or resetting the sensors may be included in yet another embodiment.

Figure 12E:
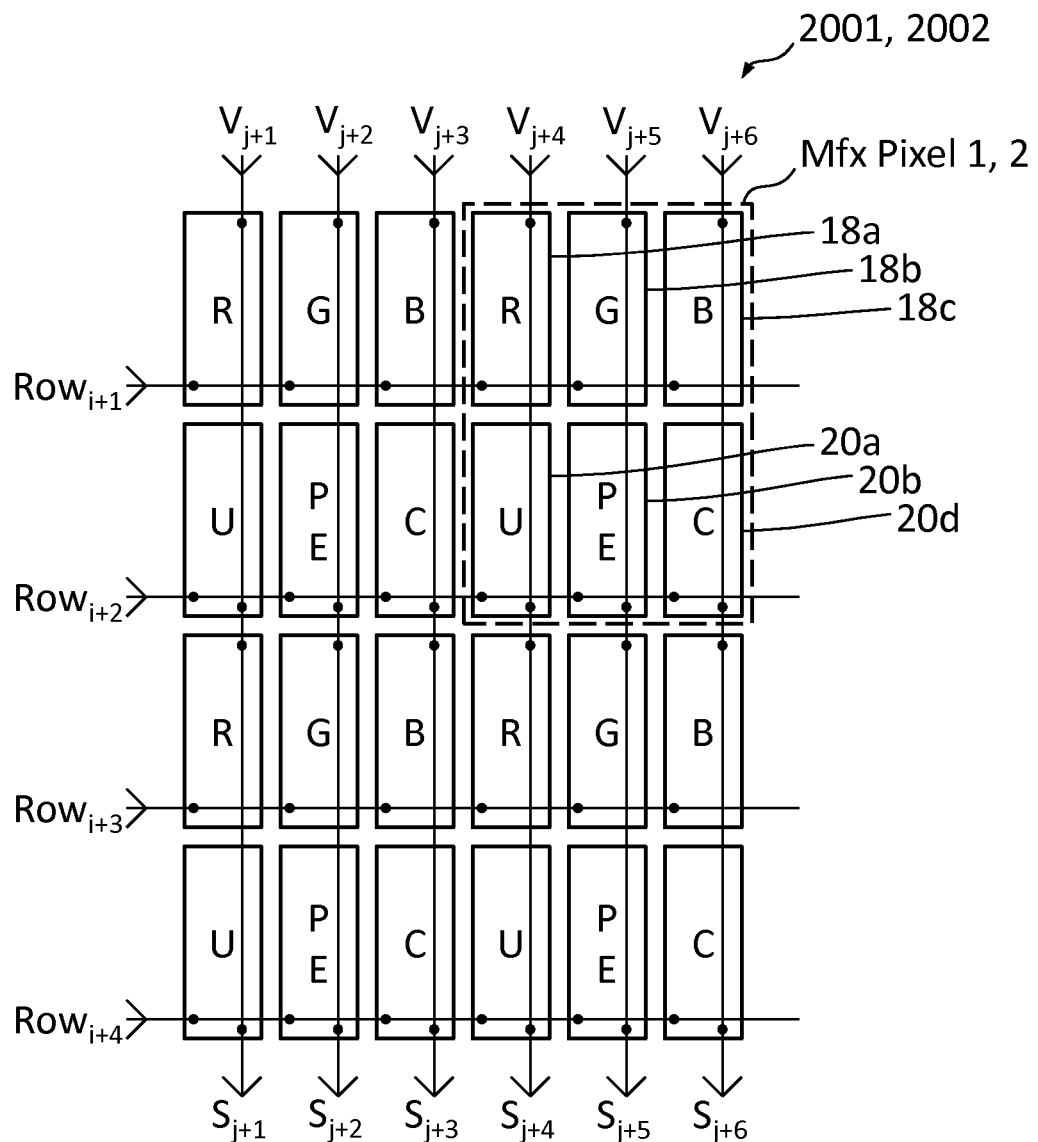
Figure 12F:
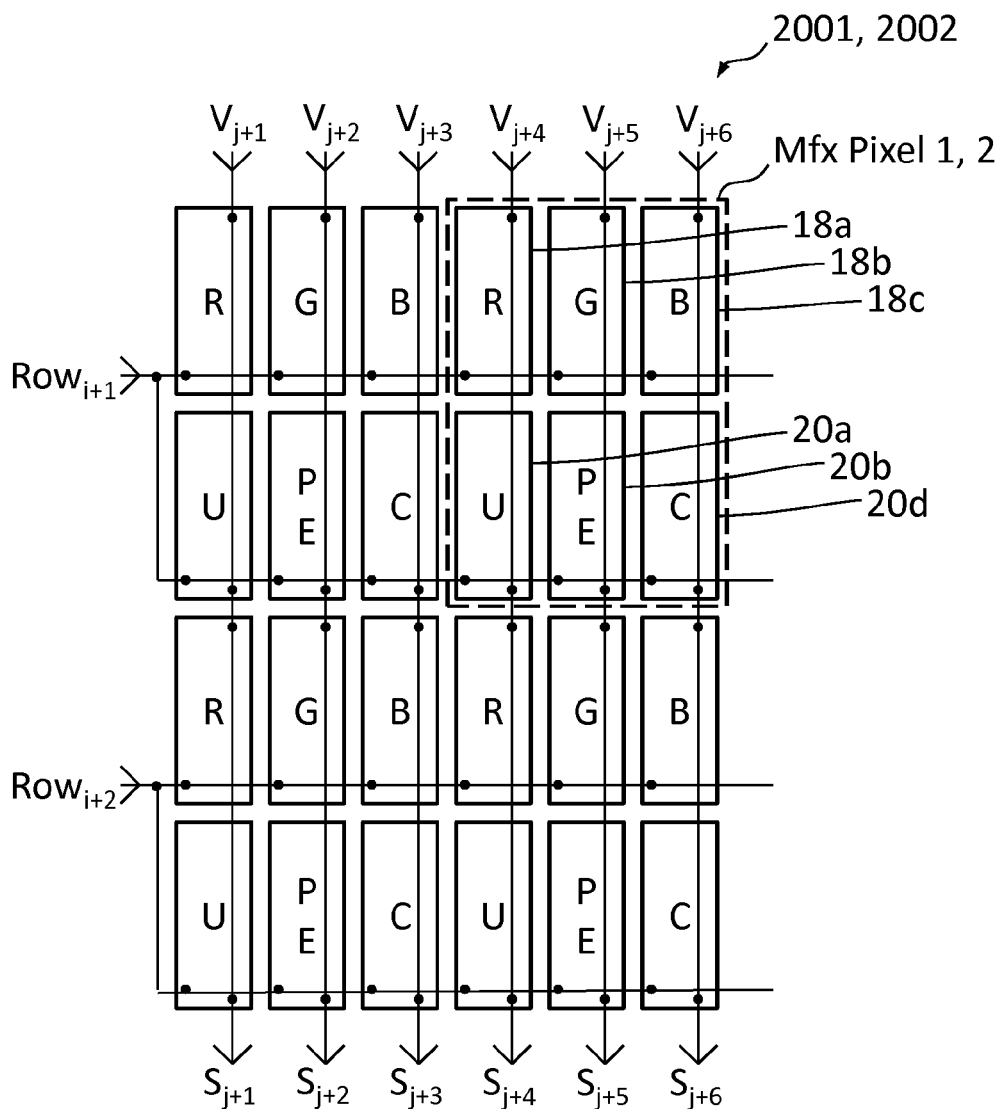

In a further embodiment, as depicted in FIG. 12E, the number of video input lines and sensor output lines may be reduced by driving the display pixels and sensing the sensor output signals with the same column line. In this embodiment, the common column line may be used for video input while rows of display pixels are selected, and used for sensor output when rows of sensors are selected. A high output impedance mode for the display column drivers may be included to allow accurate detection of the sensor output signals on the column lines when in a sense mode. Another embodiment, as depicted in FIG. 12F, may have common display/sensor row select lines and common video input/sensor output column lines.

It is also possible to have an embodiment where one or more sensors are interspersed with the display sub-pixels in each multifunctional pixel, or an embodiment where the display sub-pixels and sensor elements are in quantities and positions other than those shown.

As the resolution of the sensor elements in a multifunctional pixel display array may be configured to be adjustable during operation such as by accessing alternate rows and alternate columns, addressing a subset of rows and columns, or skipping groups of one or more rows or columns, the frame rate of data acquisition from the sensors may also be adjustable. That is, the frame rate for the sensor elements may be higher than, the same as or lower than the frame rate for the display elements. In one example, the frame rate of an in-cell capacitive sensor array may be much faster than the display update rate, so that touch or stylus input data may be acquired at a rapid rate when needed such as for stylus tracking. In another example, the frame rate of an in-cell ultrasonic fingerprint sensor array may be reduced from the display update rate to allow the acquisition of high-resolution biometric information such as fingerprints. The frame rate for the acquisition of sensor data may be dynamic, based on the varying need for sensor data with different applications. The frame size may be dynamic, allowing rapid access of sensor data from smaller portions of the display array to allow, for example, tracking of a stylus or other object on or near the surface of the display array. The dynamic frame size and dynamic frame rate may be used to detect gestures of objects on or near the display array, allowing rapid tracking of the gesture. In some modes, a portion or all of the sensor elements may be accessed in a reverse direction for at least a time. In one mode of operation, the acquisition of sensor data from a multifunctional pixel display array may be suspended for a time when no sensor data is requested, while updates to the display elements in the display array continue. In a different mode of operation, the backlight of an LCD-based display array may be turned off or darkened to allow sensor data such as data from photoelectric sensors in the display array to be taken.

It is also possible, in a different embodiment where independent accessing of display elements and sensor elements is provided for, the use of common row-select lines or common video input and sensor output lines may place constraints on the timing and order of providing video or display input data and acquiring sensor output data. For example, the sequence may be to first write the video data and second read the sensor output data, and then repeat. In a second example, the video or display data may be written for multiple consecutive frames, with one or more sensor acquisition frames inserted between the write frames when needed. In a third example, the video or display data may be written nearly continuously, with sensor data taken when there is a lull in the display data or a need for acquiring sensor data arises. In a fourth example, the sensors in the display array may be accessed at a very low frame rate (e.g. once every second, minute, hour or more) while the display is off until the display is turned on or some other event occurs.

Figures 13A, 13B, 13C:
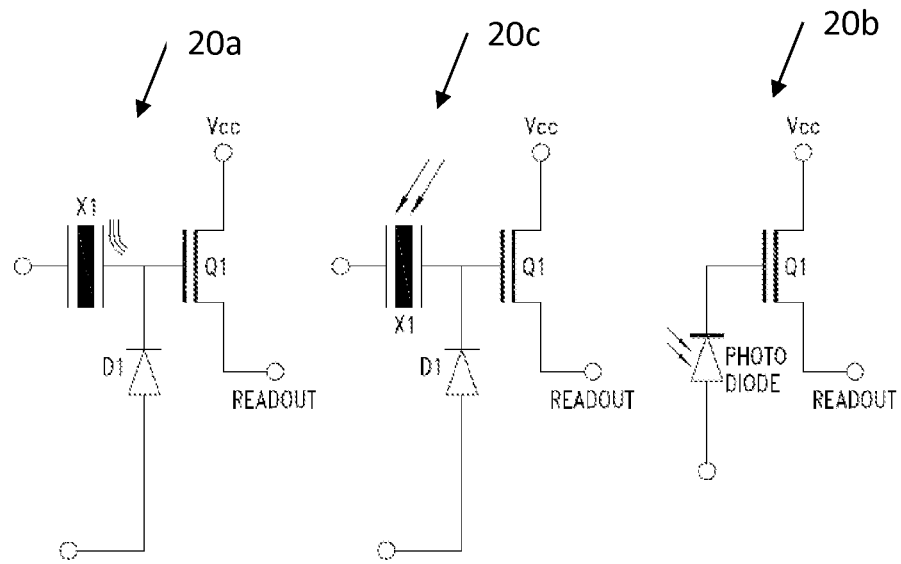
FIGS. 13A-13D depict sensors that may be used in conjunction with a piezoelectric device.
Figure 13D:
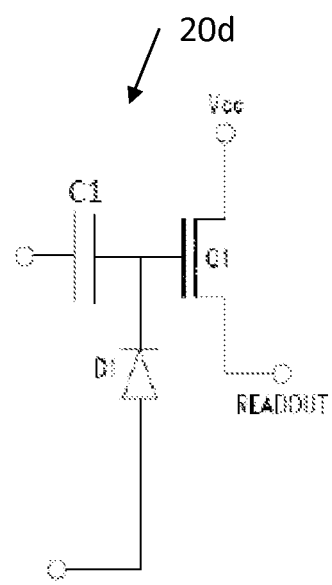

FIG. 13A depicts an ultrasonic (piezoelectric) sensor 20a that can be used in the displays 2001, 2002 shown in FIGS. 12A and 12B. The piezoelectric sensor may be used, for example, to measure higher frequency ultrasonic signals, medium-frequency acoustic signals, or low-frequency applied pressure or force signals. The piezoelectric sensor may detect, for example, acoustic emissions that may be emitted when a finger or stylus rubs or taps the surface of a display array. FIG. 13B depicts an infrared (pyroelectric) sensor 20c that can be used in the multifunctional pixel system shown in FIGS. 12A and 12B. The pyroelectric sensor may be used, for example, to detect infrared energy, thermal energy, or heat. FIG. 13C depicts a photoelectric sensor 20b that can be used in the multifunctional pixel system shown in FIGS. 12A and 12B. The photoelectric sensor may be used, for example, to detect optical light or infrared light. FIG. 13D depicts a capacitive sensor 20d that may be used in the displays 2001, 2002 shown in FIGS. 12A and 12B. The capacitive sensor 20d may be used, for example, to detect capacitance or changes in capacitance from an object such as a finger placed on or near the displays 2001, 2002 shown in FIGS. 12A and 12B.

Figure 14:
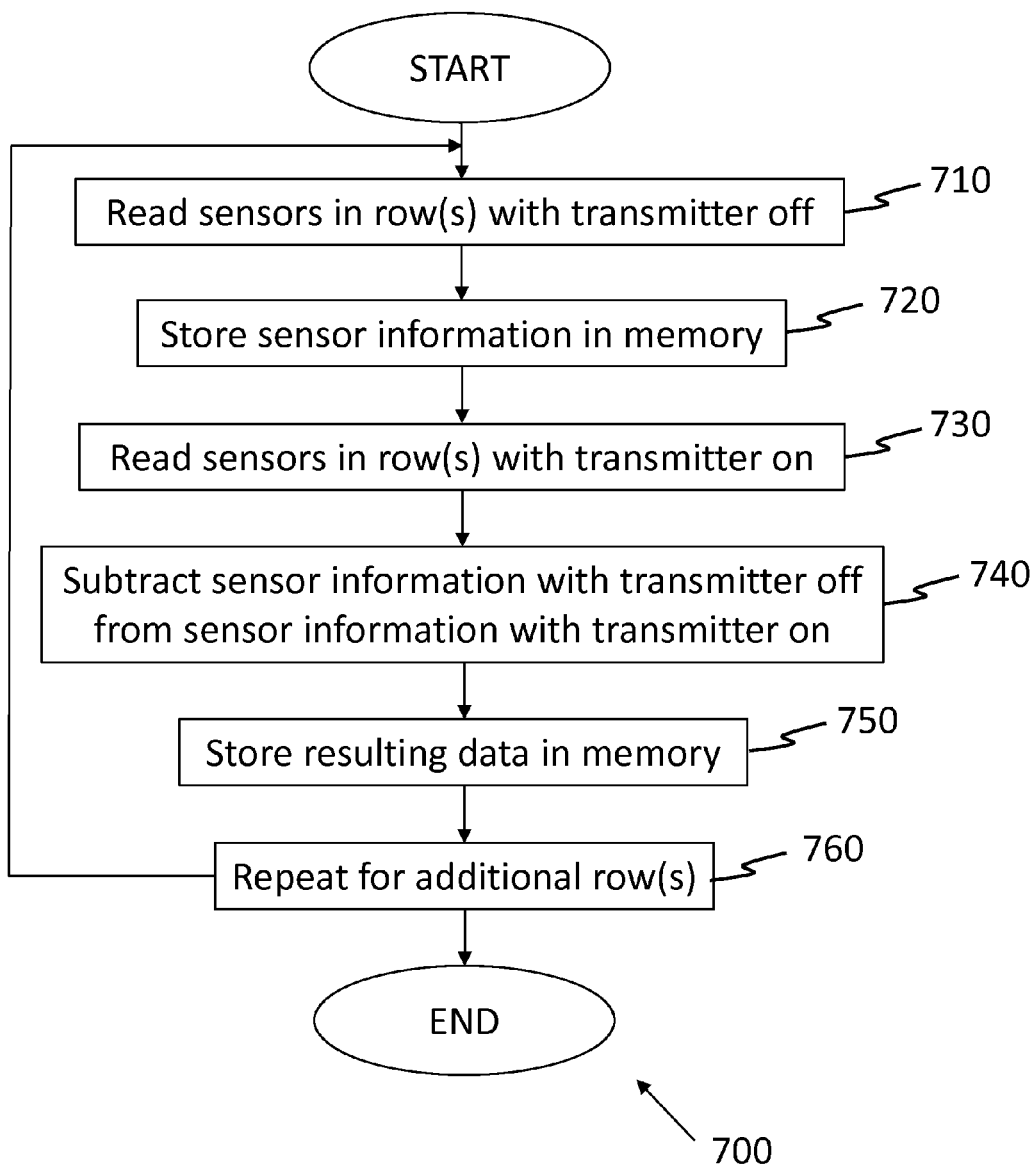
FIG. 14 depicts a method of reading out information from a sensor array according to the present disclosure.

FIG. 14 depicts a method 700 of reading out information from a sensor array according to the present disclosure. The sensor array may be comprised of a plurality of piezoelectric sensors. Each piezoelectric sensor may include an ultrasonic transmitter and an ultrasonic receiver. The ultrasonic transmitter and ultrasonic receiver may be distinct elements, or may be a single element (e.g. the ultrasonic transmitter can also act as an ultrasonic receiver). Piezoelectric sensor information obtained by the receiver may be read out by electronic circuitry (e.g. with analog-to-digital converters) in row or column fashion, and a computer may be used to create data from that information. That data may be used to create an image of an object. As one example, the method 700 can include reading 710 sensor information from one or more rows of a sensor array while the ultrasonic transmitter is turned off. The information from the read rows may be stored 720 in a memory such as a non-transitory computer readable medium. In one particular example, information from one to two rows are read at a time and stored. Sensor information from the row(s) of the sensor array may be read 730 with the ultrasonic transmitter on. The stored information in memory may be subtracted 740 from the information from the row(s) read with the ultrasonic transmitter on, and the resulting data set may be stored 750 in the memory. Due to charge decays in the sensor array, there may be about 4,000 sensor pixels that are read before the sensor array must be refreshed. Therefore, the preceding steps 710 through 750 may be repeated 760 until the information from the desired row(s) have been stored. Alternatively, one or more rows of sensor pixels may be read after the ultrasonic transmitter is turned on, followed by a reset of the one or more rows of sensor pixels with the ultrasonic transmitter off and a second reading of the sensor pixels. In a manner similar to method 700, the sensor information with the reset sensor pixels and the ultrasonic transmitter off may be subtracted from the sensor information with the ultrasonic transmitter on.

FIGS. 15 and 16A-16C depict in-cell display devices with sensing elements positioned among display elements forming part of a visual display. These devices may be used in apparatuses, or to perform methods, according to the present disclosure. As used herein, the phrase "in-cell" refers to one or more sensors physically located with display elements that collectively make up a multifunctional pixel for a visual display. Such an arrangement results in a multifunctional pixel generally having one or more display sub-pixels for producing color (e.g. red, green and blue, or red, green, blue and yellow) and one or more sensing elements, such as a piezoelectric sensor (e.g. an ultrasonic sensor), a pyroelectric sensor (e.g. an infrared sensor), a photoelectric sensor (e.g. an optical light sensor or an infrared light sensor), or a capacitive sensor, one or more of which may be used to detect objects near to or in contact with the visual display. Such a pixel is referred to herein as a multifunctional pixel or "super-pixel" because it includes more components and functionality than a conventional display pixel.

Figure 15:
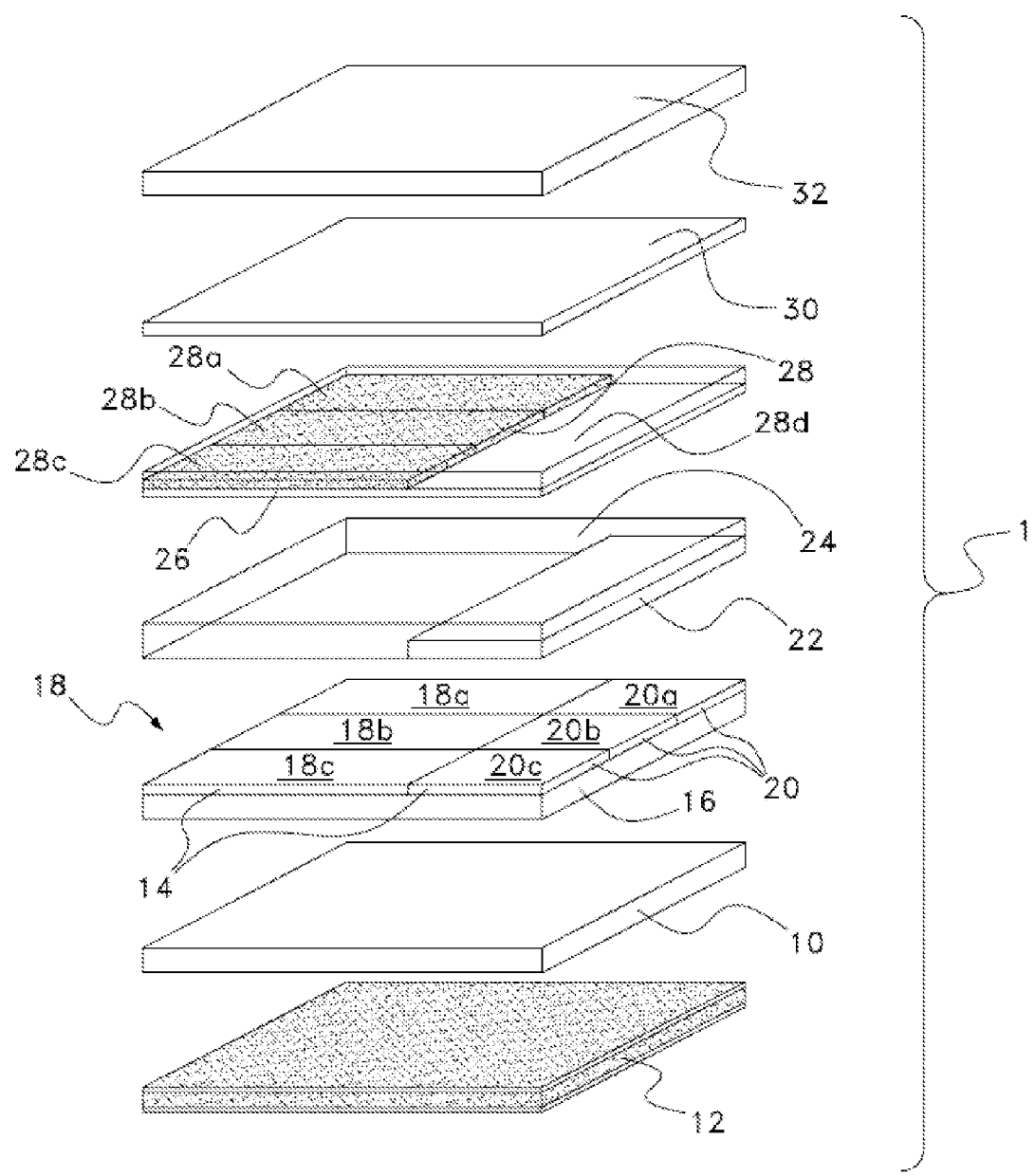
FIG. 15 is an exploded perspective view of a multifunctional pixel according to an embodiment of the present disclosure.

FIG. 15 is an exploded perspective view of a multifunctional pixel 1 according to one embodiment of the present disclosure. The multifunctional pixel 1 may be used to form a touch-enabled, stylus-enabled, or fingerprint-enabled liquid-crystal display (LCD) device. The multifunctional pixel 1 may include an edge-lit backlight panel 10 attached to a piezoelectric film ultrasonic transmitter 12 having a piezoelectric film or layer sandwiched between two conductive electrodes. On the surface of the backlight panel 10 opposite the ultrasonic transmitter 12, a thin-film transistor (TFT) array 14 on a glass or plastic TFT substrate 16 may be attached. The TFT array 14 can be constructed of one or more circuits and sub-circuits. The multifunctional pixel 1 may include an LCD display pixel 18 with one or more LCD display sub-pixels 18a-c and a plurality of sensors 20. The display sub-pixels 18a-c may correspond to red, green and blue color sub-pixels, respectively. In some implementations, sensor 20a may be an ultrasonic sensor, sensor 20b may be a photoelectric sensor, and sensor 20c may be an infrared sensor. Sensors 20, including an ultrasonic sensor 20a or an infrared sensor 20c, may be associated with a layer of piezoelectric polymer 22 that is bonded to or otherwise disposed on a conductive pad that serves as a pixel input electrode on the TFT array 14, for example, to a field-effect transistor (FET) input of the associated sensor circuit. An ultrasonic sensor 20a with the piezoelectric polymer 22 may also act as an infrared or thermal sensor. For example, the piezoelectric polymer 22 may be used as part of an infrared sensor if the piezoelectric polymer 22 exhibits pyroelectric properties. In that manner, the ultrasonic sensor 20a can be used to detect ultrasonic and infrared signals.

The sensors 20 may include one or more sensor circuits and sub-circuits such as an ultrasonic sensor circuit, an acoustic sensor circuit, a piezoelectric sensor circuit, a piezoelectric force sensor circuit, a piezoelectric pressure sensor circuit, a photoelectric circuit, a light sensor circuit, an infrared light sensor circuit, a pyroelectric sensor circuit, a thermal sensor circuit, or a capacitive sensor circuit. Sensors 20, such as a photoelectric sensor 20b, may use a PIN diode to receive optical or infrared light and convert it to a charge. An optical filter that blocks infrared light (not shown) or an infrared filter than blocks visible light (not shown) may be positioned over the PIN diode to sense optical light or infrared light, respectively. In some embodiments, the piezoelectric polymer 22 may be sufficiently optically transparent that it can be positioned above the photoelectric sensor circuit without substantially affecting the photoelectric sensor circuit's ability to receive light. In other embodiments, the piezoelectric polymer 22 may be disposed in a manner so as not to overlay the photoelectric sensor circuit. For example, in such an arrangement the piezoelectric polymer 22 may not reside between the photoelectric sensor circuit and the platen 32. A capacitive sensor may have a sensor input electrode electrically connected to, for example, a charge amplifier, an integrator, or other capacitance sensing circuit for the detection of capacitance values.

In another embodiment, a piezoelectric polymer 22 may overlay the capacitive sensor. The piezoelectric layer may serve as a dielectric layer for the input to the capacitive sensor. The piezoelectric layer may also serve as a dielectric isolation layer for the capacitive sensor to minimize the potential for dielectric breakdown. The TCF electrode layers 21, and/or 23 may be omitted above the capacitive sensor. Alternatively, the TCF electrode layers 21, 23 may be patterned and etched around the periphery of the capacitive sensor to electrically isolate the electrodes. In an embodiment, a piezoelectric layer such as a piezoelectric polymer 22 may be included as part of an ultrasonic sensor, a piezoelectric sensor, a pyroelectric (infrared or thermal) sensor, and/or a capacitive sensor. In other embodiments, the piezoelectric layer may overlay a photoelectric light sensor (optical light or infrared light), as some piezoelectric layers such as a layer of polyvinylidene fluoride (PVDF) or polyvinylidene-trifluoroethylene (PVDF-TrFE) copolymers are substantially transparent in the visible and infrared spectral regions. In yet another embodiment, the PVDF or PVDF-TrFE layer may be included over the LCD or OLED display elements. As illustrated in FIG. 15, substantial portions of the display pixel 18 and the sensors 20 may be positioned or otherwise disposed on a common substrate. Substantial portions of the display pixel 18 and the sensors 20 may lie in substantially the same plane.

FIG. 15 shows a layer of liquid crystal material 24 on the TFT array 14 above the circuitry for the display pixel and sub-pixels. The liquid crystal material 24, in some implementations, may extend over the sensor circuits. By controlling the voltage applied across the liquid crystal material 24, light from the backlight panel 10 can be allowed to pass through the display pixels in varying amounts. The piezoelectric polymer 22 may be circumscribed by, or partially circumscribed by the liquid crystal material, above, and/or below the liquid crystal material 24. FIG. 15, for example, shows a portion of the layer of liquid crystal material 24 as being above the piezoelectric polymer 22, and shows another portion of the liquid crystal material beside the piezoelectric polymer 22. FIG. 15 also depicts a transparent conducting film (TCF) electrode 26 positioned above the liquid crystal material 24. The TCF electrode 26 may be formed from materials such as ITO (indium tin oxide), IZO (indium zinc oxide), FTO (fluorinated tin oxide), GZO (gallium zinc oxide), PEDOT or poly(3,4-ethylenedioxythiophene), or other conductive materials that are substantially transparent and can be used as electrically conductive films.

The TCF electrode 26 may be used as a common electrode for the sensors 20 and the display pixel 18. In the example shown in FIG. 15, the TCF electrode 26 may be affixed to a color filter array 28. The color filter array 28 may include three individual color filter elements 28a, 28b and 28c corresponding to, for example, red, green and blue color filters for each display pixel. The color filter elements 28a, 28b and 28c may be formed or otherwise disposed on a color filter substrate 28d, such as a glass or plastic layer. Above the color filter array 28 may be a polarizing filter 30. A platen 32 can be provided as an outermost protective layer, which may also serve as a cover glass or cover lens. The platen 32 may be made of a layer of scuff-resistant glass or plastic.

The visual aspects of such a display may operate in a fashion similar to most LCD displays. A voltage between the TFT array 14 and the TCF electrodes 26 allows each display sub-pixel 18a, 18b and 18c to turn on or off. Each display pixel 18 may have a black matrix (not shown) that surrounds the individual sub-pixels 18a, 18b and 18c so as to exclude unwanted light from the backlight panel 10 that may leak through the space between individual display sub-pixels 18*a*, 18*b* and 18*c*.

Figure 16A:
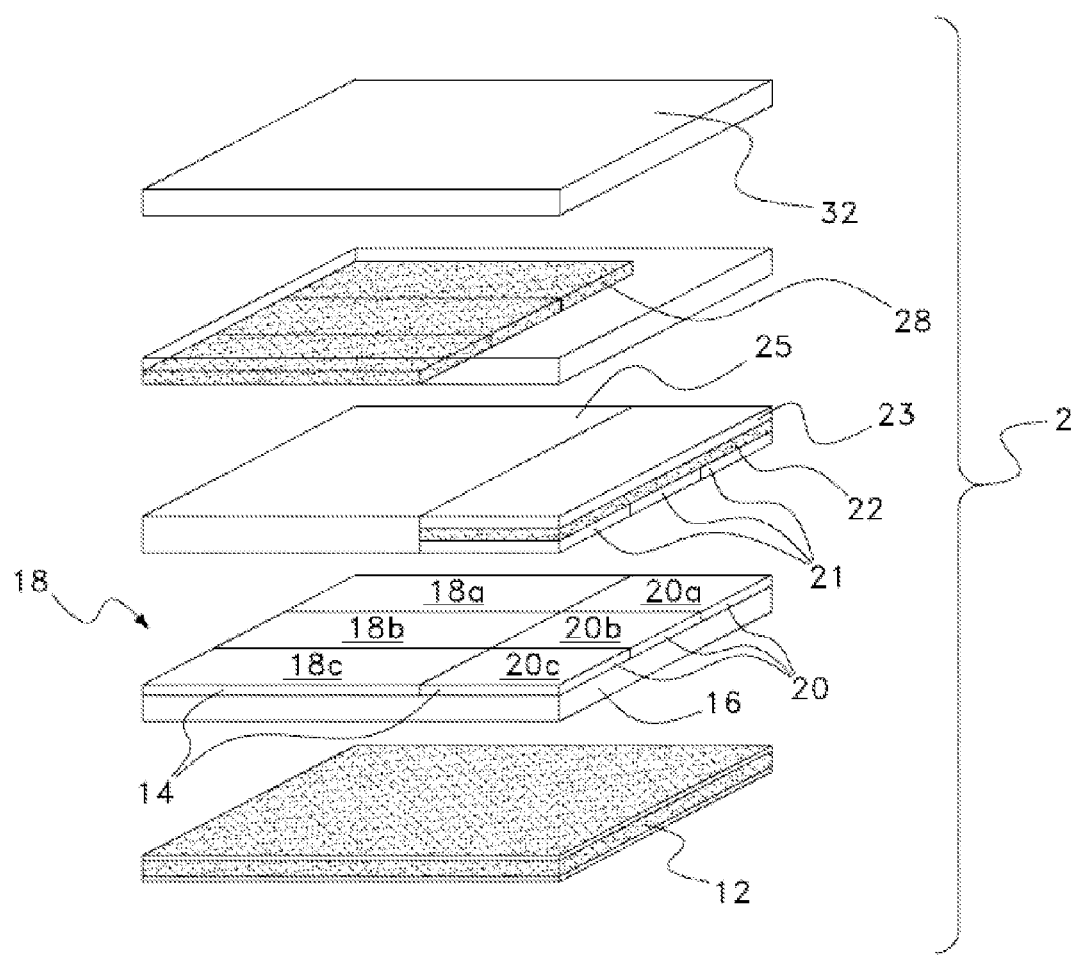
FIGS. 16A-16C are exploded perspective views of other embodiments of a multifunctional pixel.
Figure 16B:
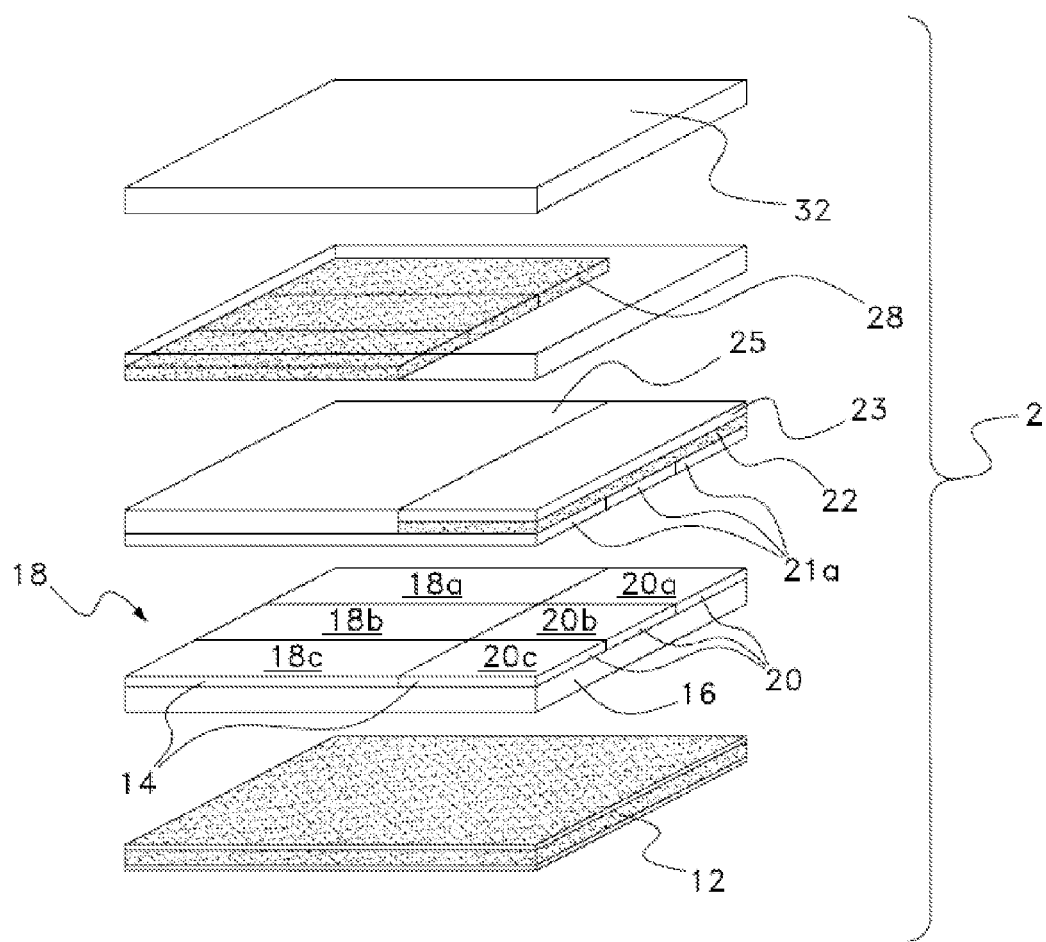
Figure 16C:
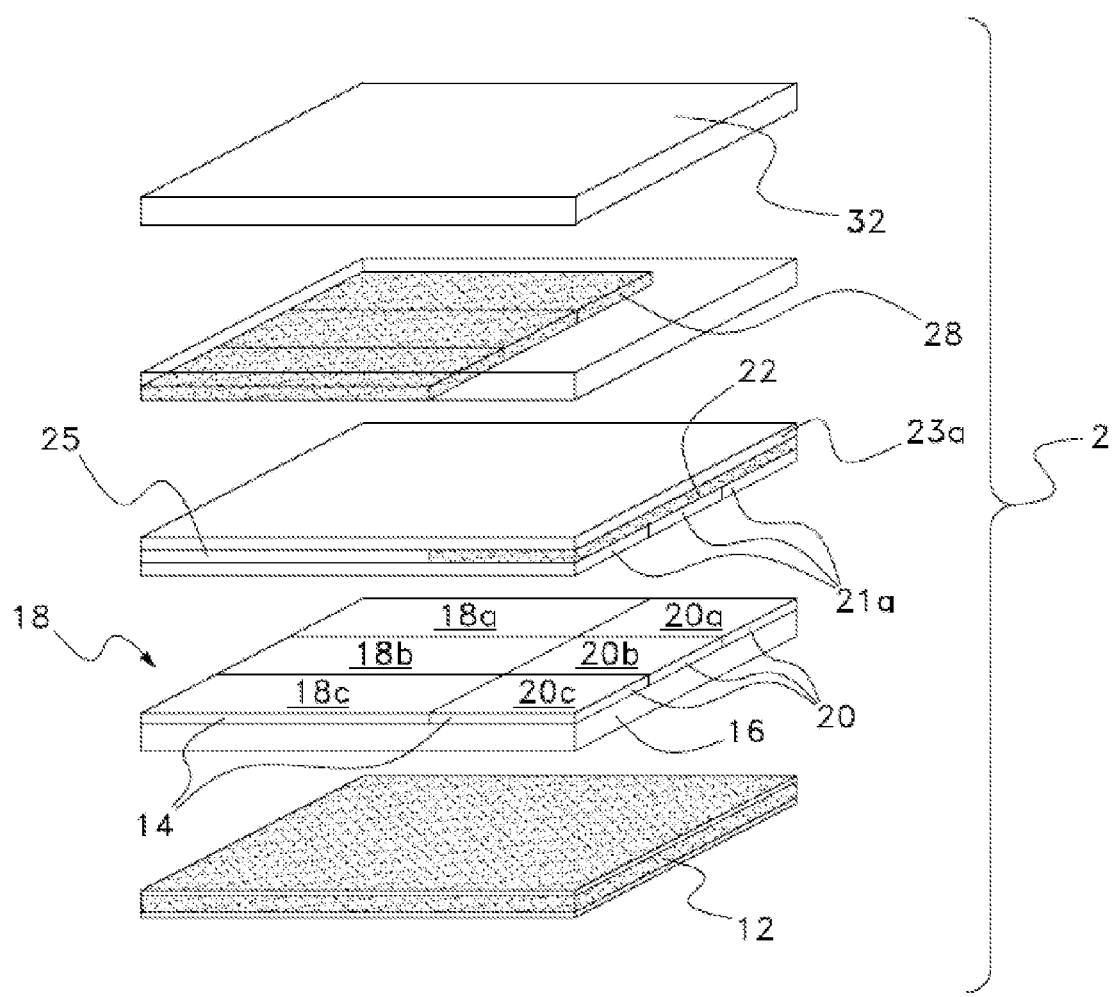

FIGS. 16A-16C are exploded perspective views of other embodiments of a multifunctional pixel 2. In these embodiments, OLED sub-pixels are combined to form the display pixel 18. The multifunctional pixel 2 may have a plurality of sensors 20 and a display pixel 18 with one or more OLED display sub-pixels 18*a*, 18*b* and 18*c*. A piezoelectric film ultrasonic transmitter 12 may be attached to the back of TFT substrate 16 of the TFT array 14. The TFT array 14 may include a display pixel 18 with one or more light emitting display pixels or display sub-pixels 18*a*, 18*b* and 18*c*. As shown in FIG. 16A, a first TCF electrode 21, a layer of piezoelectric polymer 22, and a second TCF electrode 23 may be positioned above associated sensor circuits, but not be positioned above display sub-pixels 18*a*, 18*b*, and 18*c*. In another embodiment, shown in FIG. 16B, first TCF electrode layer 21*a* may be disposed above the sensor circuits and above display sub-pixels 18*a*, 18*b*, and 18*c*. In a third embodiment, depicted in FIG. 16C, the first TCF electrode 21*a* and the second TCF electrode 23*a* may be disposed above the sensor circuits and above display sub-pixels 18*a*, 18*b*, and 18*c*.

Optically transparent insulating material 25 is shown in FIGS. 16A-16C above three OLED display sub-pixels 18*a*-*c*. In the embodiment shown in FIG. 16A, the insulating material 25 may isolate the OLED display sub-pixels 18*a*-*c* from the TCF electrodes 21 and 23. In the embodiments shown in FIGS. 16B-16C, the insulating material 25 may isolate the OLED display sub-pixels 18*a*-*c* from the TCF electrode 23.

A color filter array 28 may be provided to allow the red-green-blue visual display colors. A cover glass that may serve as a platen 32 may be provided to protect the display device against physical abrasion and mechanical damage. Each display pixel 18 may have a black matrix (not shown) that surrounds the individual sub-pixels so as to exclude unwanted light from neighboring OLED sub-pixels that may leak through any spaces between individual display sub-pixels 18*a*, 18*b* and 18*c*.

The sensors 20 may include one or more sensor circuits and sub-circuits such as an ultrasonic sensor circuit, an acoustic sensor circuit, a piezoelectric sensor circuit, a piezoelectric force sensor circuit, a piezoelectric pressure sensor circuit, a photoelectric sensor circuit, an optical light sensor circuit, an infrared light sensor circuit, a pyroelectric infrared sensor circuit, a thermal sensor circuit, or a capacitive sensor circuit. For example, sensor 20*a* may be an ultrasonic sensor that includes an ultrasonic sensor circuit, sensor 20*b* may be a photoelectric sensor that includes a photoelectric sensor circuit, and sensor 20*c* may be an infrared sensor that includes an infrared sensor circuit. In some embodiments, the piezoelectric ultrasonic sensor circuit and the pyroelectric infrared sensor circuit may be similar in many regards with the use of a peak detector, a biasing circuit and a piezoelectric/pyroelectric layer, although the external biasing and timing circuit may use a timing window to detect reflected ultrasonic signals for the ultrasonic sensor and no timing window (and no ultrasonic transmitter activity) for detecting thermal or infrared energy. The photoelectric sensor circuit of the photoelectric sensor 20*b* may be formed by substituting a peak detecting diode and capacitor, used in some implementations of the ultrasonic or infrared sensors, with a PIN-type photodiode. PIN-type photodiodes can convert optical or infrared light to charge directly. Once available as charge, the TFT array circuitry may be used to output a signal via row and column addressing circuitry associated with the TFT array.

A person having ordinary skill in the art will recognize that the various layers comprising the sensor circuits and portions of the sensors could be situated on different layers within the display stack and still achieve the same or similar function. Thus, the particular arrangements described herein should not be viewed as the only arrangements in which the in-cell technology can be implemented.

Figure 17:
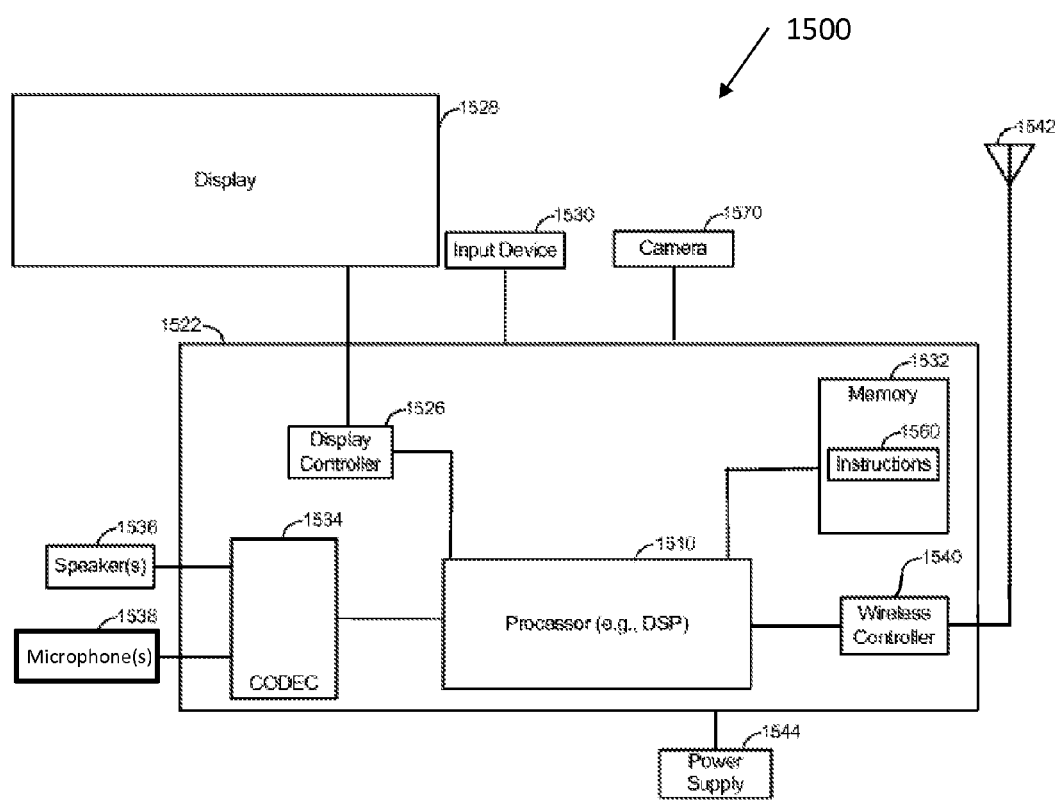
FIG. 17 is a block diagram of an illustrative embodiment of a mobile device.

One or more multifunctional pixels 1, 2 described above may be included in a mobile device such as a medical device or a consumer device such as a mobile phone. FIG. 17 depicts a block diagram of an illustrative embodiment of a mobile device, which is generally designated 1500. The device 1500 may include a microprocessor 1510, such as a digital signal processor (DSP) or a microcontroller, coupled to a memory 1532. In an illustrative example, the microprocessor 1510 includes image processing logic configured to identify features of captured images or image information. The microprocessor 1510 may be operable to perform various tasks assigned to the mobile device. In a particular embodiment, the memory 1532 may be a non-transitory computer readable medium that includes instructions 1560. The microprocessor 1510 may be configured to execute the instructions 1560 stored in the memory 1532 in order to perform tasks assigned to the mobile device. In another illustrative example, the memory 1532 may store optical images captured by a camera 1570.

Mobile device 1500 may also include a display controller 1526 coupled to the microprocessor 1510 and to a display device 1528. The display device 1528 may correspond to the in-cell display device depicted in FIG. 15 or FIGS. 16A-16C having one or more multifunctional pixels 1, 2. A coder/decoder (CODEC) 1534 may be coupled to the microprocessor 1510. One or more speakers 1536 and microphones 1538 may be coupled to the CODEC 1534. In a particular embodiment, the microphone 1538 may be configured to capture audio. The microphone 1538 may be configured to capture audio while the camera 1570 captures video.

A wireless controller 1540 may be coupled to the microprocessor 1510 and to an antenna 1542. In a particular embodiment, the microprocessor 1510, the display controller 1526, the memory 1532, the CODEC 1534, and the wireless controller 1540 are included in a system-in-package or system-on-chip (SOC) device 1522. In a particular embodiment, an input device 1530 and a power supply 1544 may be coupled to the system-on-chip device 1522. In an illustrative example in which the mobile device 1500 includes a touch-screen, the display device 1528 and the input device 1530 may be at least partially integrated using an in-cell system having one or more multifunctional pixels 1, 2. In a particular embodiment, as illustrated in FIG. 17, the display device 1528, the input device 1530, the speakers 1536, the microphones 1538, the antenna 1542, the power supply 1544, and the camera 1570 are external to the system-on-chip device 1522. However, each of the display device 1528, the input device 1530, the speakers 1536, the microphones 1538, the antenna 1542, the power supply 1544, and the camera 1570 may be coupled to a component of the system-on-chip device 1522, such as an interface or an embedded microcontroller.

When equipped with an ultrasonic sensor, a display device 1528 including one or more multifunctional pixels 1, 2 may include a piezoelectric film ultrasonic transmitter 12. During operation, the ultrasonic transmitter 12 may emit an ultrasonic pulse that may travel through the various layers of the multifunctional pixel 1, 2 toward and through the platen 32. An object residing on the platen 32, such as finger 34, may absorb some of the ultrasonic energy, and some of the ultrasonic energy that is not absorbed by the object may be reflected back through the platen 32 to the ultrasonic sensor 20a. By noting the signals that ultrasonic sensor 20a receives, information about the object may be determined. For example, if the object is a finger 34, the information derived from the ultrasonic sensors may enable the creation of a visual representation of the fingerprint. Conductive traces may connect the ultrasonic sensor circuits of the ultrasonic sensor 20a with electronics that allow for reading out signals produced by the ultrasonic sensors 20a.

Figure 18:
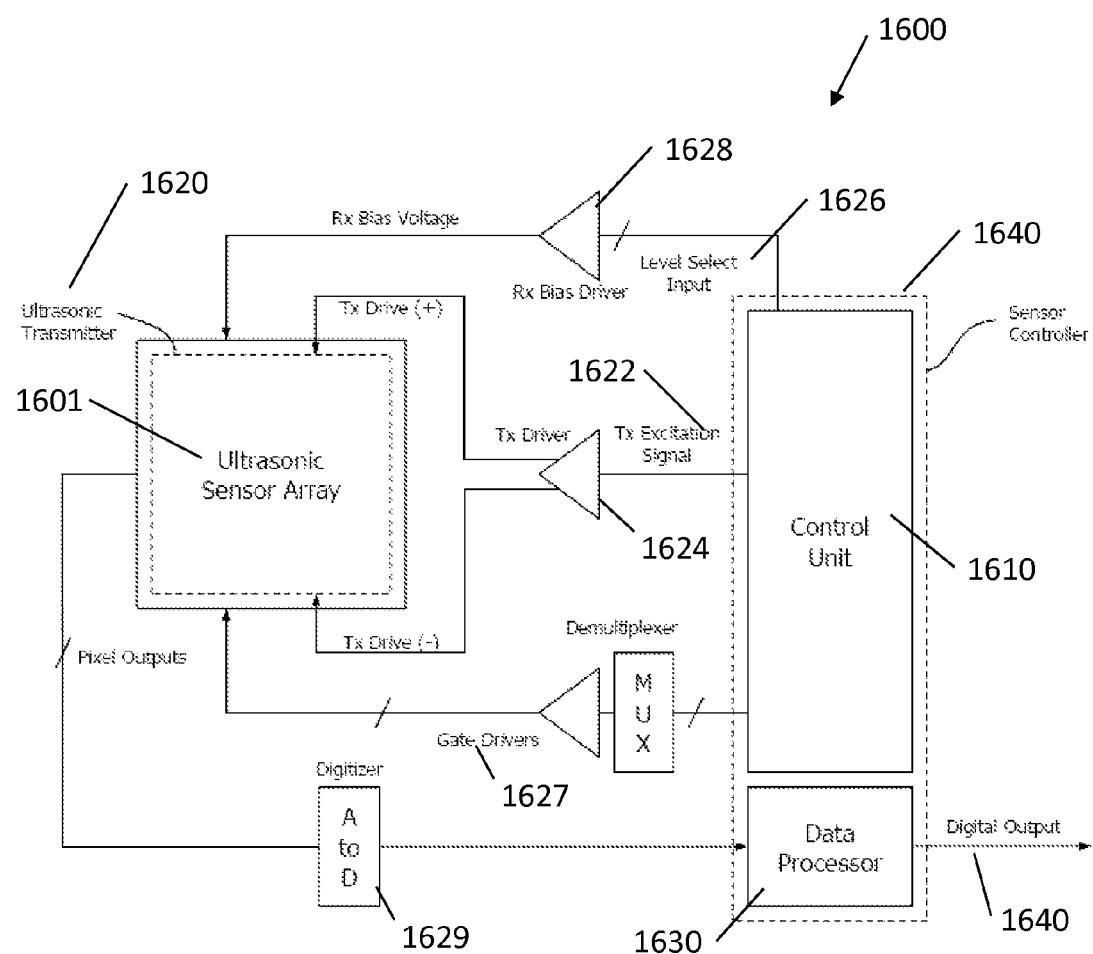
FIG. 18 is a block diagram of an ultrasonic sensor array that may be used with a display device including a multifunctional pixel display array.

FIG. 18 depicts a block diagram of an ultrasonic sensor system that may be used with a display device including a multifunctional pixel display array. FIG. 18 depicts circuitry 1600 associated with an ultrasonic sensor array 1601. A control unit 1610 may send signals to the ultrasonic sensor array 1601 to send an ultrasonic pulse via ultrasonic transmitter 1620. For example, control unit 1610 may send a transmitter excitation signal 1622 to transmitter driver 1624 to drive the ultrasonic transmitter 1620. The control unit 1610 may activate circuitry to read out signals provided by the ultrasonic sensor array 1601. For example, the control unit 1610 may send a level select input 1626 to a receiver bias driver 1628 to control the bias of the ultrasonic sensor array 1601. By knowing the time that the reflected ultrasonic energy is expected to arrive at the ultrasonic sensor array 1601, the control unit 1610 may read out the sensor signals that are associated with the ultrasonic energy that has been reflected from the platen 32 where the finger 34 (or other object, such as a stylus) resides. The control unit 1610 may control the readout of multifunctional pixels 1, 2 that make up the ultrasonic sensor array 1601 via gate drivers 1627. Once the sensor signals are read out, a data processor 1630 may be used to form a digitized data set corresponding to the sensor signals, and this data set may be provided as digital output 1640. A digitizer 1629 such as an analog-to-digital converter may be provided to convert the pixel outputs, which may be analog, into digital form. The data processor 1630 may be a digital signal processor, or other similar processor.

If an object (such as a finger 34) resides on the platen 32, the ultrasonic pulse or wave that reaches the object continues from the platen 32 to the object, where the energy is absorbed. For example, the ridges of a fingerprint that contact a platen 32 will substantially absorb the ultrasonic energy transmitted, via the platen 32, to the finger 34. However, where there are valleys of a fingerprint, which do not contact the platen 32, the ultrasonic energy will be substantially reflected back through the platen 32, and detected by the ultrasonic sensor array 1601. Other electronics may read out the individual row and column signals from the ultrasonic sensor array 1601 and the data processor 1630 may be used to create data derived from the signals. That data may be used to create an image of the object (for example, an image of the fingerprint).

Figure 19:
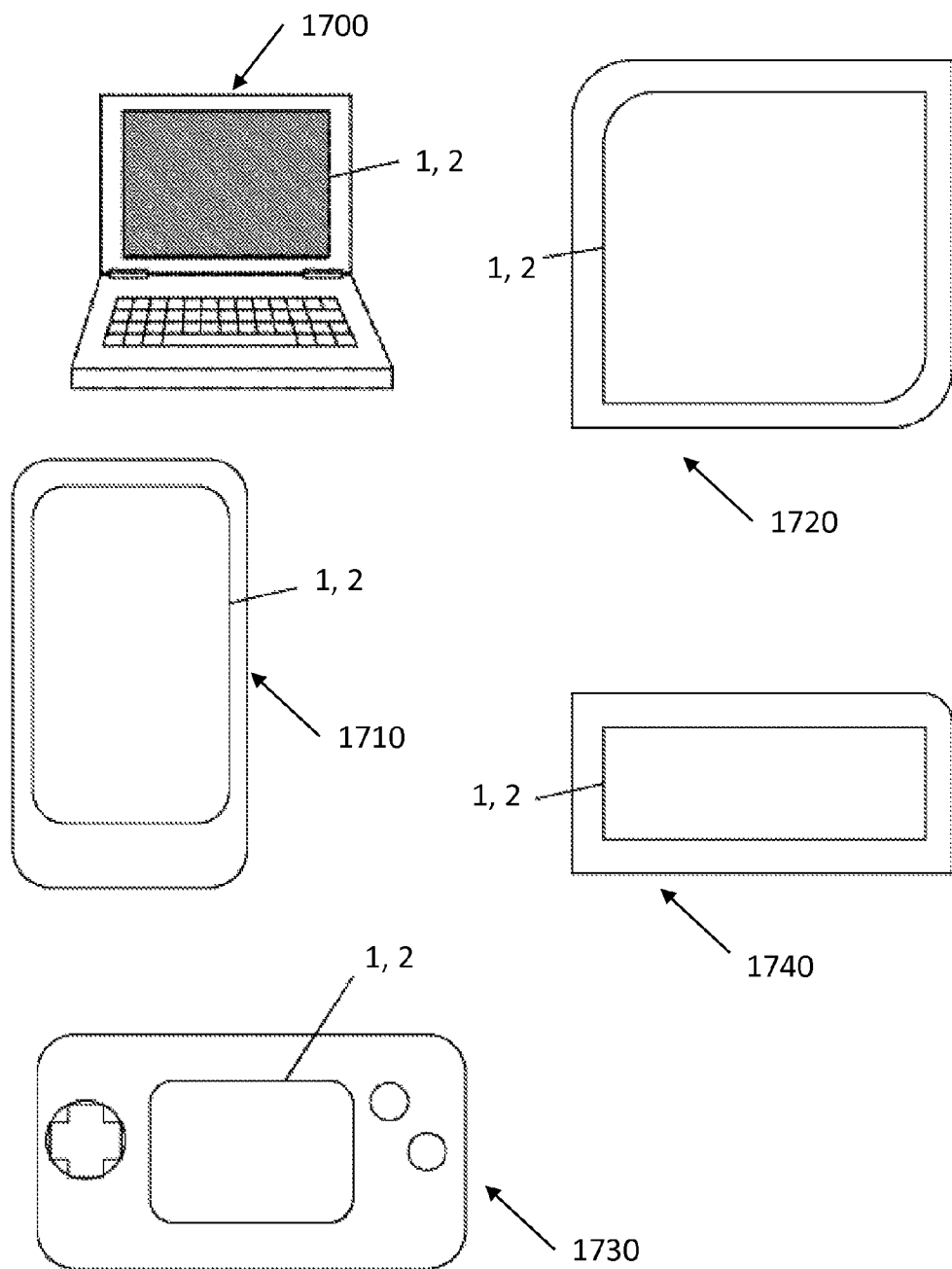
FIG. 19 depicts devices that may utilize a multifunctional pixel or pixel array.

FIG. 19 depicts devices that may utilize a multifunctional pixel or pixel display array. Display devices having an array of multifunctional pixels 1, 2 may include a laptop computer 1700, a cellphone 1710, a tablet computer 1720 (e.g. an iPad®), a game console 1730, and a medical device 1740.

Figure 20:
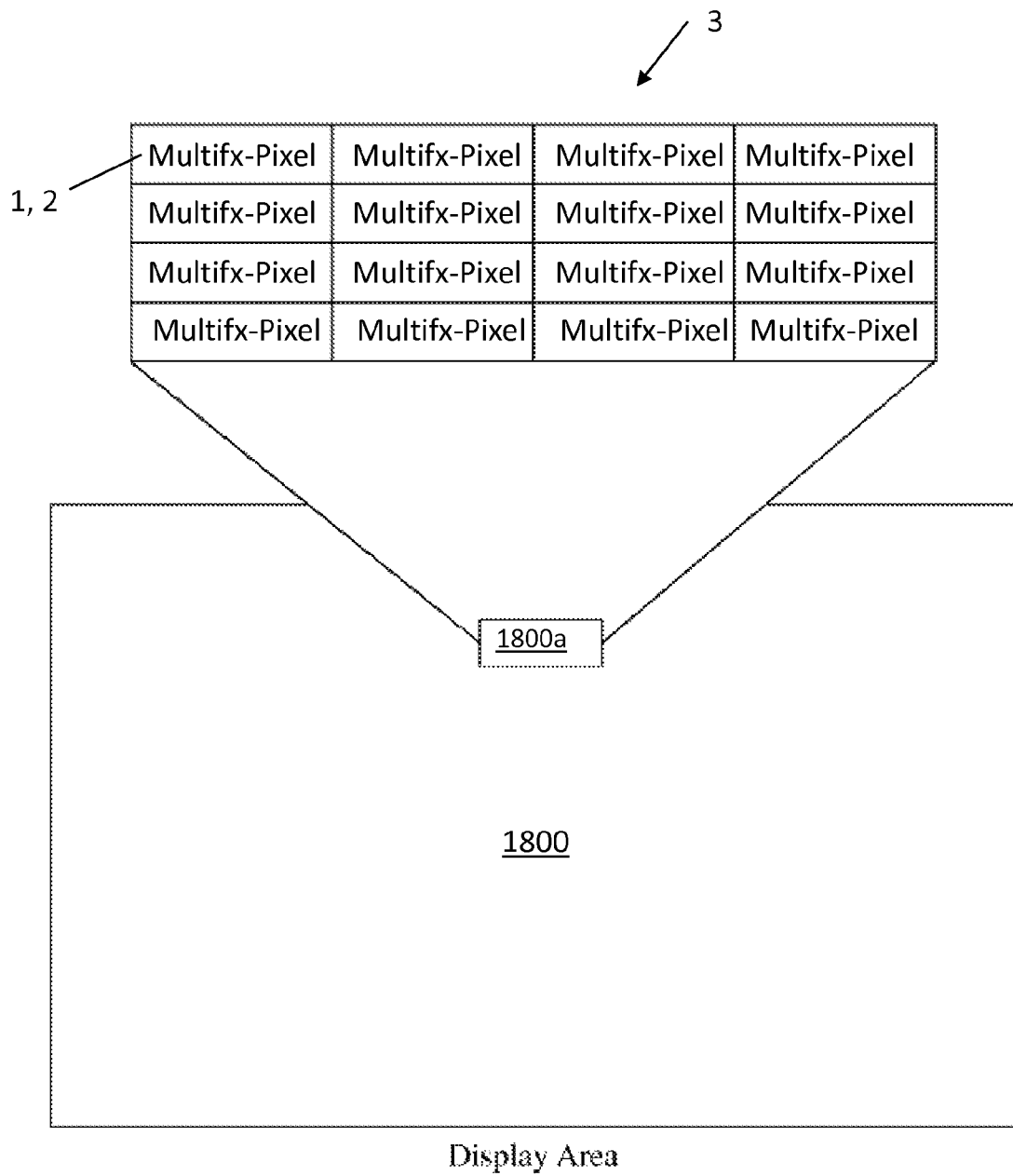
FIG. 20 depicts a visual display, including an array of multifunctional pixels, a portion of which has been enlarged.

FIG. 20 depicts a visual display including an array of multifunctional pixels, a portion of which has been enlarged. The enlarged part 1800a of the visual display 1800 includes a display sub-array 3 of sixteen multifunctional pixels 1, 2. In this implementation, each pixel in the display sub-array 3 is a multifunctional pixel 1, 2. In some modes of operation, one or more sensor circuits of sensors 20 need not be turned on. In this manner, the sensor resolution may be altered. For example, if multifunctional pixels 1, 2 are turned on in every other row and every other column of the display 1800, the sensor resolution will be one-fourth that of the visual resolution of the display 1800.

Figure 21:
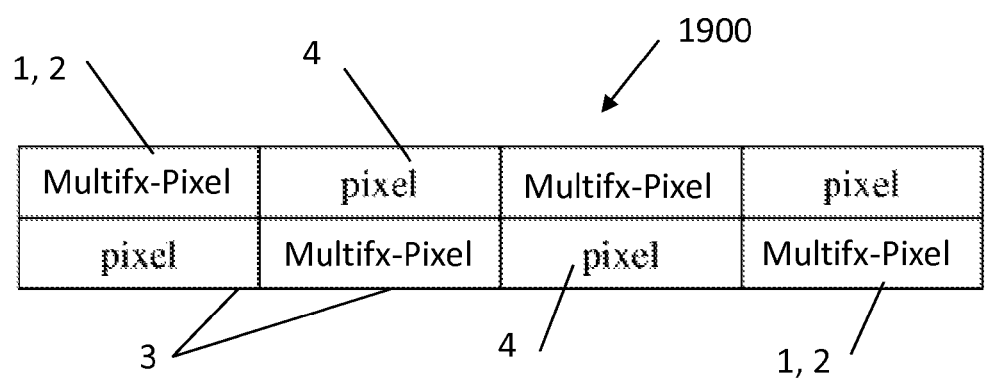
FIG. 21 depicts another visual display, including an array of multifunctional pixels alternating with display pixels.

FIG. 21 depicts another visual display including an array of multifunctional pixels alternating with display pixels. In this implementation, multifunctional pixels 1, 2 are arranged in a two-by-two display sub-array 3 having a checkerboard pattern with display pixels 4 having no sensing functions or with sensing functions disabled, and the sensor resolution is one-half that of the visual resolution of the display 1800.

Figure 22:
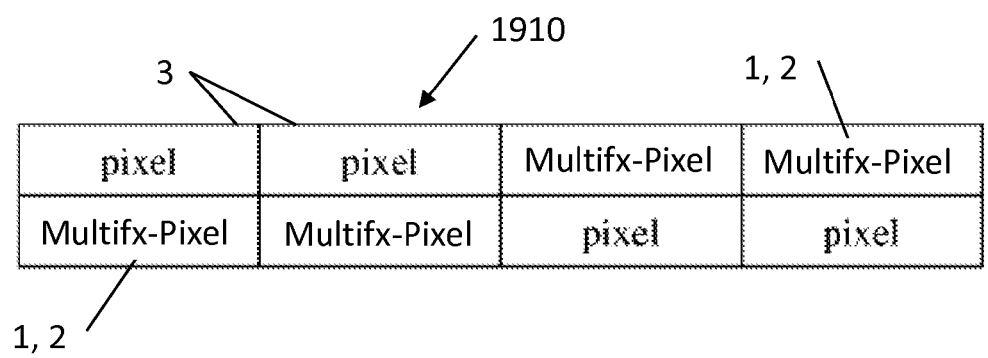
FIG. 22 depicts another visual display, including an array of multifunctional pixels and display pixels.

FIG. 22 depicts another visual display including an array of multifunctional pixels and display pixels. In this implementation, a two-by-two display sub-array 3 of two multifunctional pixels 1, 2 are placed next to two display pixels 4 having no sensing functions or with sensing functions disabled, or otherwise discounted, with a sensor resolution that is half of the display resolution.

Figure 23A:
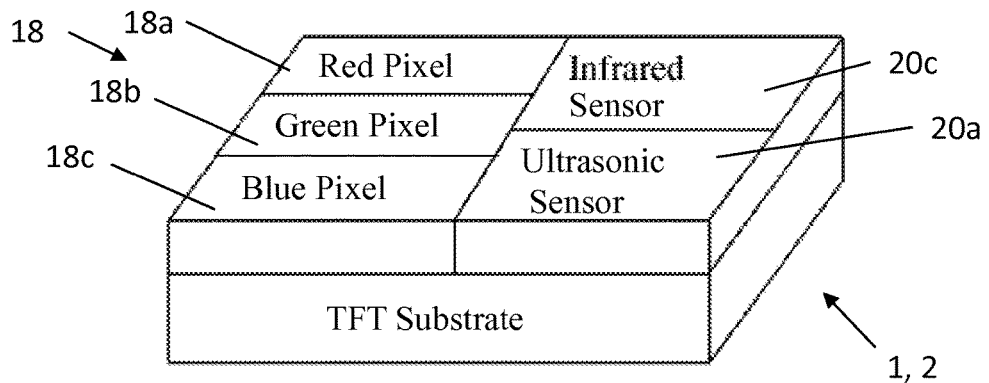
FIGS. 23A-23F illustrate various arrangements of multifunctional pixels.
Figure 23B:
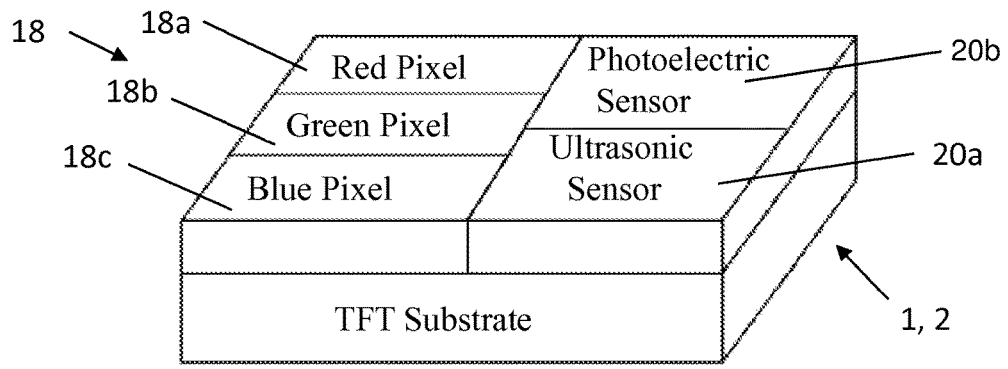
Figure 23C:
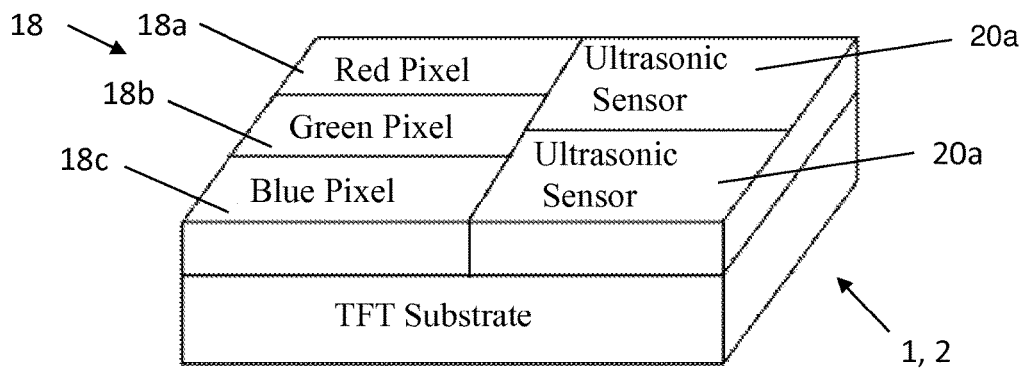
Figure 23D:
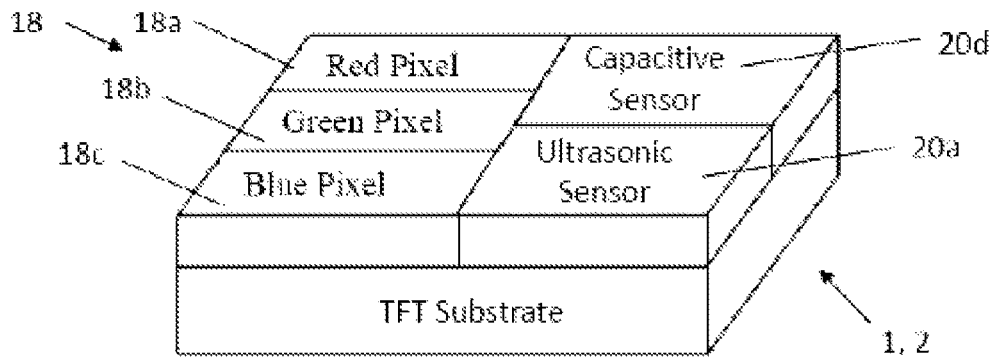
Figure 23E:
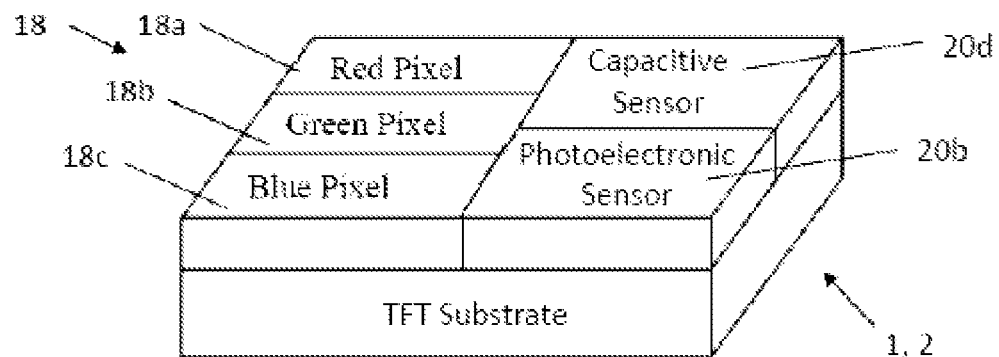
Figure 23F:
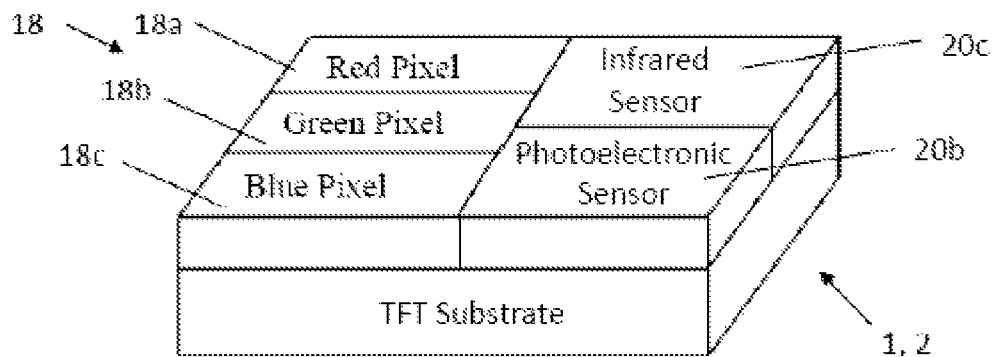

FIGS. 23A-23F illustrate various arrangements of multifunctional pixels. The multifunctional pixels may include display pixels 18 with a combination of one or more ultrasonic sensors 20a, photoelectric sensors 20b, infrared sensors 20c, or capacitive sensors 20d. Note that in FIGS. 23A-23F, not all layers of the multifunctional pixel 1, 2 are shown for clarity. In FIG. 23A, there is shown an in-cell multifunctional pixel 1, 2 having a display pixel 18 with red, green and blue display sub-pixels 18a, 18b and 18c, respectively, an ultrasonic sensor 20a, and an infrared sensor 20c. In FIG. 23B, there is shown an in-cell multifunctional pixel 1, 2 with a display pixel 18 having red, green, and blue display sub-pixels 18a-c, an ultrasonic sensor 20a, and a photoelectric sensor 20b. In FIG. 23C, there is shown an in-cell multifunctional pixel 1, 2 having red, green and blue display sub-pixels 18a-c, a first ultrasonic sensor 20a, and a second ultrasonic sensor 20a. In FIG. 23D, there is shown an in-cell multifunctional pixel 1, 2 having red, green and blue display sub-pixels 18a-c, an ultrasonic sensor 20a, and a capacitive sensor 20d. In FIG. 23E, there is shown a multifunctional pixel 1, 2 with a display pixel 18 having red, green and blue display sub-pixels 18a-18c, a photoelectric sensor 20b, and a capacitive sensor 20d. In FIG. 23F, there is shown a multifunctional pixel 1, 2 with a display pixel 18 having red, green and blue sub-pixels 18a-c, a photoelectric sensor 20b, and an infrared sensor 20c. Other implementations (not shown) may include a multifunctional pixel 1, 2 with a display pixel, a photoelectric light sensor (optical light or infrared light), and a capacitive sensor 20d. Other implementations may include other combinations of display pixels and one or more sensors.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method comprising:
    detecting an infrared signal with a piezoelectric device;
    obtaining an infrared signal representation based on the detected infrared signal;
    detecting a combined ultrasonic and infrared signal with the piezoelectric device;
    obtaining a combined representation based on the detected combined ultrasonic and infrared signal;
    generating an output representation based on the infrared signal representation and the combined representation; and
    transmitting an ultrasonic signal with the piezoelectric device in response to the detected infrared signal.

2. The method of claim 1, further comprising comparing the combined representation to the infrared signal representation; wherein the output representation is generated from the comparison.

3. The method of claim 1, wherein one or more of the following is an image: the combined representation, the infrared signal representation, and the output representation.

4. The method of claim 1, wherein the piezoelectric device includes one or both of an ultrasonic transmitter and a receiver that can act as an ultrasonic receiver and an infrared receiver.

5. The method of claim 1, further comprising focusing ultrasonic energy or infrared energy onto the piezoelectric device with a lens.

6. The method of claim 4, wherein the piezoelectric device includes a receiver that can act as an ultrasonic receiver and an infrared receiver.

7. The method of claim 4, further comprising controlling a display in response to the detected infrared signal.

8. The method of claim 7, wherein the piezoelectric device is located in the display.

9. The method of claim 8, further comprising adjusting a frame rate of the piezoelectric device in response to the detected infrared signal.

10. The method of claim 7, further comprising determining movement of an object relative to the piezoelectric device based upon the detected infrared signal.

11. The method of claim 7, wherein the detected infrared signal corresponds to detecting heat from an object.

12. The method of claim 11, further comprising transmitting an ultrasonic signal with the piezoelectric device in response to the detected heat from the object.

13. The method of claim 11, further comprising determining a location of the object relative to the piezoelectric device based upon the detected infrared signal.

14. The method of claim 12, further comprising:
    determining that the object has moved away from the piezoelectric device; and
    determining not to send an additional ultrasonic signal in response to the determination that the object has moved away from the piezoelectric device.

15. The method of claim 1, further comprising:
    transmitting an ultrasonic signal with an ultrasonic transmitter of the piezoelectric device;
    detecting a reflected ultrasonic signal arising from the transmitted ultrasonic signal with the piezoelectric receiver of the piezoelectric device;
    forming the combined representation from the detected reflected ultrasonic signal; and storing the combined representation in a memory.

16. The method of claim 1, further comprising controlling a display in response to the output representation.

17. The method of claim 1, further comprising making a biometric measurement from the output representation.

18. An apparatus comprising:
    a processor configured to:
        detect an infrared signal with a piezoelectric device;
        transmit an ultrasonic signal with the piezoelectric device in response to the detected infrared signal;
        obtain an infrared signal representation based on the detected infrared signal;
        obtain a combined representation based on a detected ultrasonic signal and the detected infrared signal; and
        display an output representation from the infrared signal representation and the combined representation.

19. The apparatus of claim 18, wherein the processor is configured to compare the infrared signal representation to the combined representation; wherein the output representation is displayed from the comparison.

20. The apparatus of claim 18, further comprising the piezoelectric device in communication with the processor, the piezoelectric device configured to detect an infrared signal, transmit an ultrasonic signal, and detect a reflected ultrasonic signal.

21. The apparatus of claim 20, wherein the processor is configured to form the infrared signal representation and the combined representation from signals detected with the piezoelectric device.

22. The apparatus of claim 20, further comprising a lens configured to focus ultrasonic energy or infrared energy onto the piezoelectric device.

23. An apparatus comprising:
    means for detecting an infrared signal and transmitting an ultrasonic signal in response to the detected infrared signal; and
    a processor configured to
        obtain an infrared signal representation based on the detected infrared signal;
    generate an output representation from the infrared signal representation and the combined representation; and
    control a display in response to the detected infrared signal; wherein
        the piezoelectric device is located in the display.

24. The apparatus of claim 23, wherein the processor is configured to compare the combined representation to the infrared signal representation; and the output representation is generated from the comparison.

25. The apparatus of claim 23, wherein the processor is configured to store the combined representation, the infrared signal representation, or the output representation.

26. The apparatus of claim 23, wherein:
    the detected ultrasonic signal is a reflected ultrasonic signal arising from the transmitted ultrasonic signal; and the processor is configured to form the combined representation.

* * * * *